US011427190B2

(12) United States Patent
Yang et al.

(10) Patent No.: US 11,427,190 B2
(45) Date of Patent: Aug. 30, 2022

(54) SELF-DRIVING METHOD, AND APPARATUS

(71) Applicant: HUAWEI TECHNOLOGIES CO., LTD., Guangdong (CN)

(72) Inventors: Zhihua Yang, Beijing (CN); Hui Li, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 790 days.

(21) Appl. No.: 16/114,173

(22) Filed: Aug. 27, 2018

(65) Prior Publication Data

US 2018/0362032 A1 Dec. 20, 2018

Related U.S. Application Data

(63) Continuation of application No. PCT/CN2016/074827, filed on Feb. 29, 2016.

(51) Int. Cl.
*B60W 30/09* (2012.01)
*B60W 40/10* (2012.01)
(Continued)

(52) U.S. Cl.
CPC ............ *B60W 30/09* (2013.01); *B60W 10/20* (2013.01); *B60W 30/0956* (2013.01); *B60W 30/18163* (2013.01); *B60W 40/10* (2013.01); *B60W 40/107* (2013.01); *B62D 15/0255* (2013.01); *G01C 21/3658* (2013.01); *G08G 1/096716* (2013.01); *G08G 1/096741* (2013.01); *G08G 1/096775* (2013.01); *G08G 1/096811* (2013.01);
(Continued)

(58) Field of Classification Search
None
See application file for complete search history.

(56) References Cited

U.S. PATENT DOCUMENTS

| 5,942,993 A | 8/1999 | Mio et al. |
| 2008/0059832 A1 | 3/2008 | Yamazaki et al. |

(Continued)

FOREIGN PATENT DOCUMENTS

| CN | 101101702 A | 1/2008 |
| CN | 104064050 A * | 9/2014 |

(Continued)

OTHER PUBLICATIONS

Shan Yanfeng, Machine translation of CN-104064050-A, Sep. 2014, espacenet.com (Year: 2014).*

*Primary Examiner* — David P. Merlino
(74) *Attorney, Agent, or Firm* — Womble Bond Dickinson (US) LLP

(57) ABSTRACT

Embodiments of the present invention relate to a self-driving method and an apparatus. The method includes: sending, by a first vehicle, lane change request information and first real-time information to a network device; receiving, by the first vehicle, lane change indication information sent by the network device, where the lane change indication information is determined by the network device according to the first real-time information and second real-time information that is sent by a second vehicle, and the lane change indication information indicates that the first vehicle is allowed to perform lane change; and changing, by the first vehicle, from the first lane to the second lane according to the lane change indication information.

8 Claims, 5 Drawing Sheets

(51) Int. Cl.
  *B60W 30/18* (2012.01)
  *G08G 1/16* (2006.01)
  *G08G 1/0968* (2006.01)
  *G01C 21/36* (2006.01)
  *G08G 1/0967* (2006.01)
  *B62D 15/02* (2006.01)
  *B60W 10/20* (2006.01)
  *B60W 30/095* (2012.01)
  *B60W 40/107* (2012.01)
  *G08G 1/00* (2006.01)

(52) U.S. Cl.
  CPC ....... *G08G 1/096844* (2013.01); *G08G 1/164* (2013.01); *G08G 1/166* (2013.01); *G08G 1/167* (2013.01); *G08G 1/205* (2013.01); *B60W 2520/10* (2013.01); *B60W 2554/00* (2020.02)

(56) References Cited

U.S. PATENT DOCUMENTS

| | | | |
|---|---|---|---|
| 2009/0088925 A1 | 4/2009 | Sugawara et al. | |
| 2014/0309814 A1* | 10/2014 | Ricci | H04L 67/12 701/2 |
| 2015/0185026 A1* | 7/2015 | Hightower | G01C 21/3658 701/533 |
| 2017/0144657 A1* | 5/2017 | Hassani | B60W 10/20 |

FOREIGN PATENT DOCUMENTS

| | | | | |
|---|---|---|---|---|
| CN | 104064050 | A | 9/2014 | |
| CN | 104267721 | A | 1/2015 | |
| CN | 104616541 | A | 5/2015 | |
| CN | 104637299 | A | 5/2015 | |
| CN | 105015545 | A | 11/2015 | |
| EP | 2202601 | A2 | 6/2010 | |
| JP | H10105880 | A | 4/1998 | |
| JP | H11339186 | A | 12/1999 | |
| JP | H11351891 | A | 12/1999 | |
| JP | 2001074487 | A | 3/2001 | |
| JP | 2001147133 | A | 5/2001 | |
| JP | 2007127450 | A | 5/2007 | |
| JP | 2008059064 | A | 3/2008 | |
| JP | 2008059094 | A | 3/2008 | |
| JP | 2009078735 | A | 4/2009 | |
| KR | 20140117836 | A | 10/2014 | |
| WO | 03094129 | A1 | 11/2003 | |
| WO | WO-2015177157 | A1 * | 11/2015 | ............ G02B 27/01 |

* cited by examiner

SELF-DRIVING METHOD, AND APPARATUS

CROSS-REFERENCE TO RELATED APPLICATIONS

This application is a continuation of International Application No. PCT/CN2016/074827, filed on Feb. 29, 2016. The disclosure of which is hereby incorporated by reference in its entirety.

TECHNICAL FIELD

The present invention relates to the technical field, and in particular, to a self-driving method and an apparatus.

BACKGROUND

Current road traffic is facing tough challenges in safety, efficiency, emission, costs, and the like. A safety issue is an important issue related to human life, and is an important indicator in the traffic field. To address the safety issue in current road traffic, release of human control may be considered, to prevent a safety accident caused by a factor such as human's noncompliance. As technologies of the mobile Internet and the Internet of Things develop, and issues such as casualties, congestion, and low efficiency in conventional traffic are increasingly severe, ICT technology based-intelligent traffic is experiencing a new round of revolution, and self-driving becomes a future strategic direction.

SUMMARY

This application provides a self-driving method and an apparatus, so as to improve a driving order and driving safety of a self-driving vehicle.

According to a first aspect, a self-driving method is provided. The method includes: sending, by a first vehicle, lane change request information to a network device, to request to change from a first lane to a second lane; sending, by the first vehicle, first real-time information to the network device, where the first real-time information includes a vehicle speed and a location of the first vehicle; receiving, by the first vehicle, first lane change indication information sent by the network device, where the lane change indication information is determined by the network device according to the first real-time information and second real-time information, the lane change indication information is a response made by the network device to the lane change request information, the second real-time information is sent by the second vehicle to the network device, the second real-time information includes a vehicle speed and a location of the second vehicle, and the first lane change indication information indicates that the first vehicle is allowed to perform lane change; and changing, by the first vehicle, from the first lane to the second lane according to the lane change indication information.

Therefore, according to the self-driving method in this application, in an application scenario of lane change, information exchange can be implemented between vehicles by using the network device, and a vehicle that does not need to perform lane change coordinates with a vehicle that needs to perform lane change to perform lane change, so that safer and more ordered traffic can be achieved, and a traffic accident caused because another vehicle cannot coordinate and cooperate with a single vehicle during self-driving of the vehicle is prevented. Therefore, traffic safety can be greatly improved.

It should be understood that, the first vehicle may be any vehicle that needs to perform lane change, the first lane may be a lane on which the first vehicle is currently located, the second lane is a target lane, and the first vehicle needs to change to the second lane.

It should be understood that the first vehicle sends the first real-time information to the network device. The first real-time information includes the vehicle speed and the location of the first vehicle. The first real-time information may be real-time information periodically sent to the network device, for example, a device sends real-time information to the network device every 15 minutes. Alternatively, the first vehicle may be triggered to send the first real-time information, for example, when the first vehicle needs to perform lane change, the first vehicle sends the lane change request information to the network device, and the first vehicle is also triggered to send real-time information, that is, the first real-time information, to the network device.

Optionally, the second vehicle may be a vehicle different from the first vehicle. Specifically, the second vehicle may be a vehicle that is determined by the network device and that is affected on the first lane and the second lane by lane change by the first vehicle, and the network device may determine, according to a vehicle location and a vehicle speed, that the affected vehicle is a second vehicle.

In one embodiment, if the network device determines, according to the first real-time information and the second real-time information, that the first vehicle is not allowed to perform lane change, the method further includes: receiving, by the first vehicle, first vehicle speed information sent by the network device, where the first vehicle speed information is determined by the network device according to the vehicle speeds and the locations of the first vehicle and the second vehicle; adjusting, by the first vehicle, the vehicle speed to a first vehicle speed according to the first vehicle speed information; sending, by the first vehicle, third real-time information to the network device, where the third real-time information includes a vehicle speed and a location of the first vehicle that are obtained after the first vehicle adjusts the vehicle speed according to the first vehicle speed information; and receiving, by the first vehicle, second lane change indication information sent by the network device, where the second lane change indication information is a response made by the network device to the lane change request information according to the third real-time information and fourth real-time information, the fourth real-time information is sent by the second vehicle to the network device, the fourth real-time information includes a vehicle speed and a location that are obtained after the second vehicle adjusts the vehicle speed according to second vehicle speed information, and the second vehicle speed information is determined by the network device according to the first real-time information and the second real-time information.

In this way, when the first vehicle performs lane change, another vehicle can coordinate and cooperate with the first vehicle to perform lane change, so as to ensure lane change safety, and prevent the another vehicle from colliding with the first vehicle due to an emergency such as abrupt acceleration or deceleration that is caused because the another vehicle does not cooperate in lane change.

It should be understood that, the first vehicle sends the lane change request information to the network device, and the network device may determine, according to the first real-time information of the first vehicle and the second real-time information of the second vehicle, whether the first vehicle can perform lane change currently; and if the first vehicle can perform lane change currently, send the lane change indication information to the first vehicle; or if the first vehicle cannot perform lane change currently, may adjust the vehicle speeds of the first vehicle and the second vehicle, so that the vehicle speeds and the locations of the first vehicle and the second vehicle satisfy a lane change condition of the first vehicle, and then send the lane change indication information to the first vehicle.

In one embodiment, the first vehicle adjusts the vehicle speed according to the first vehicle speed information. The first vehicle speed information may include the first vehicle speed. The first vehicle generates a related parameter of the first vehicle speed, and controls each part of the first vehicle to adjust the vehicle speed. After adjusting the vehicle speed, the first vehicle sends the third real-time information to the network device. The third real-time information includes the adjusted vehicle speed of the first vehicle and the location of the first vehicle. The third real-time information may be periodically reported information, or may be information that is reported by means of triggering after the adjustment is completed.

Similarly, to cooperate with the first vehicle to perform lane change, the second vehicle also needs to adjust the vehicle speed, and reserve space on the second lane for the first vehicle. If the vehicle speed of the second vehicle is excessively low or excessively high, or the reserved space on the second lane is insufficient, the network device may send the second vehicle speed information to the second vehicle, and the second vehicle adjusts the vehicle speed, to coordinate and cooperate with the first vehicle to perform lane change.

In one embodiment, the method further includes: sending, by the first vehicle, a vehicle message to the network device, where the vehicle message includes current geographic location information, vehicle speed information, and destination information of the first vehicle; receiving, by the first vehicle, a route planning message that is sent by the network device according to the vehicle message, where the route planning message includes lane change information and lane change preparation area information, the lane change information is used to indicate that when driving from a current geographic location to a destination, the first vehicle needs to change from the first lane to the second lane, and the lane change preparation area information is used to indicate a location of a lane change preparation area that is on the first lane and in which the first vehicle prepares to change from the first lane to the second lane; and when the first vehicle determines, according to the route planning message, to enter the lane change preparation area, sending, by the first vehicle, the lane change request information to the network device.

Therefore, the network device plans a lane-level route, so that the first vehicle can drive to the destination more accurately, an incorrect route caused by occupation of an incorrect lane is prevented, and during lane change, another vehicle can be coordinated to cooperate, and lane change safety is further ensured.

It should be understood that, a vehicle connected to the network device includes a self-driving vehicle or a manned driving vehicle, and may send a vehicle message to the network device, to query route planning. Specifically, the first vehicle may send the vehicle message to the network device. The vehicle message includes the current geographic location information, the vehicle speed information, and the destination information of the first vehicle. The current geographic location information is used to indicate a current location of the first vehicle, and the network device may determine, according to the information, the current location of the first vehicle and a specific lane on which the first vehicle is located. The destination information is used to indicate a geographic location of the destination that the first vehicle needs to drive to, and the network device may determine, according to the information, the location of the destination and a lane on which the destination is located. In this case, the network device may determine whether the first vehicle needs to perform lane change in a process of driving to the destination. The network device sends the route planning message to the first vehicle. The route planning message includes a route for the first vehicle to drive to the destination, may further include the lane change information, where the lane change information is used to indicate that the first vehicle needs to change from the first lane to the second lane in the driving process, and may further include the lane change preparation area information, where the lane change preparation area information is used to indicate the location of the preparation area in which the first vehicle prepares to change from the first lane to the second lane.

It should be understood that, the first vehicle determines, according to the lane change preparation area information in the route planning message, the location at which the first vehicle prepares to perform lane change, and when entering the lane change preparation area, sends the lane change request information to the network device, to request to change from the first lane to the second lane.

In one embodiment, the changing, by the first vehicle, from the first lane to the second lane according to the lane change indication information includes: changing, by the first vehicle, from the first lane to the second lane according to the lane change indication information and current status information of the first vehicle, where the current status information is determined according to a road condition obtained by the first vehicle by performing detection within a preset distance.

The first vehicle can perform lane change not only according to the lane change indication information sent by the network device but also with reference to a detection result of the first vehicle that is a current road condition, so that a traffic accident is prevented when an emergency occurs.

Specifically, the first vehicle receives the lane change indication information sent by the network device, and may determine, with reference to the current status information, whether to perform lane change or how to perform lane change. For example, the first vehicle may detect whether there is an obstacle within the preset distance or whether there is another emergency within the preset distance, and determine, with reference to current road condition information, whether lane change can be performed.

In one embodiment, the method further includes: obtaining, by the first vehicle, obstacle information, where the obstacle information includes at least one of a distance between the obstacle and the first vehicle, a moving speed of the obstacle, or a location of the obstacle; and sending, by the first vehicle, the obstacle information to the network device, so that the network device sends second planning information to the second vehicle according to the obstacle information, where the second planning information is used to instruct the second vehicle to avoid the obstacle or the first vehicle after the first vehicle avoids the obstacle.

It should be understood that, the first vehicle may further detect whether there is an obstacle around, and send obstacle information to the network device, so that the network device coordinates each vehicle to avoid the obstacle. For example, if the first vehicle detects an obstacle in a lane change process, the first vehicle may send the obstacle information to the network device, and the network device determines, according to the obstacle information, how the first vehicle avoids the obstacle and how another vehicle cooperates in the avoidance. Alternatively, after the first vehicle detects an obstacle, the first vehicle avoids the obstacle, and sends an avoidance manner and obstacle information to the network device, so that the network device coordinates another vehicle to avoid the obstacle and the first vehicle.

According to a second aspect, a self-driving scheduling method is provided. The method includes: receiving, by a network device, lane change request information sent by a first vehicle, where the lane change request information is used by the first vehicle to request to change from a first lane to a second lane; receiving, by the network device, first real-time information sent by the first vehicle, where the first real-time information includes a vehicle speed and a location of the first vehicle; receiving, by the network device, second real-time information sent by a second vehicle, where the second real-time information includes a vehicle speed and a location of the second vehicle; and determining, by the network device, lane change indication information according to the lane change request information, the first real-time information, and the second real-time information, and sending the lane change indication information to the first vehicle, to instruct the first vehicle to change from the first lane to the second lane.

Therefore, according to the self-driving method in this application, in an application scenario of lane change, information exchange can be implemented between vehicles by using the network device, and a vehicle that does not need to perform lane change coordinates with a vehicle that needs to perform lane change to perform lane change, so that safer and more ordered traffic can be achieved, and a traffic accident caused because another vehicle cannot coordinate and cooperate with a single vehicle during self-driving of the vehicle is prevented. Therefore, traffic safety can be greatly improved.

It should be understood that, the network device may determine, according to the first real-time information of the first vehicle, the second real-time information of the second vehicle, and a preset rule, that a vehicle affected by lane change by the first vehicle is a second vehicle. For example, the network device may determine that on the first lane, a vehicle within a range of 500 meters behind the first vehicle is a second vehicle; or may determine that, on the second lane, a vehicle within a range of 300 meters in front of the first vehicle and a vehicle 500 meters behind the first vehicle are second vehicles. Optionally, for another example, the network device may determine a second vehicle according to a vehicle speed of each vehicle.

It should be understood that, the network device may determine, according to the first real-time information, the second real-time information, and a particular rule, whether the first vehicle can perform lane change, for example, may determine, according to the vehicle speed and the location, whether the first vehicle can perform lane change. Specifically, the network device may determine, according to whether the vehicle speeds of the first vehicle and the second vehicle satisfy preset values, whether the second vehicle on the second lane reserves enough space, so that the first vehicle can perform lane change.

If determining that the first vehicle can perform lane change, the network device sends the lane change indication information to the first vehicle. If determining that the first vehicle cannot perform lane change, the network device may adjust the vehicle speeds and the locations of the first vehicle and the second vehicle, so that the first vehicle can perform lane change.

In one embodiment, if the network device determines, according to the first real-time information and the second real-time information, that the first vehicle is not allowed to perform lane change, the method further includes: determining, by the network device, first vehicle speed information of the first vehicle and second vehicle speed information of the second vehicle according to the vehicle speeds and the locations of the first vehicle and the second vehicle, where the first vehicle speed information is used to instruct the first vehicle to adjust a current vehicle speed of the first vehicle to a first vehicle speed, and the second vehicle speed information is used to instruct the second vehicle to adjust a current vehicle speed of the second vehicle to a second vehicle speed; sending, by the network device, the first vehicle speed information to the first vehicle, and sending the second vehicle speed information to the second vehicle; receiving, by the network device, third real-time information sent by the first vehicle, where the third real-time information includes a vehicle speed and a location that are obtained after the first vehicle adjusts the vehicle speed according to the first vehicle speed information; receiving, by the network device, fourth real-time information sent by the second vehicle, where the fourth real-time information includes a vehicle speed and a location that are obtained after the second vehicle adjusts the vehicle speed according to the second vehicle speed information; and determining, by the network device, the lane change indication information according to the lane change request information, the third real-time information, and the fourth real-time information.

It should be understood that, when determining, according to the first real-time information and the second real-time information, that the first vehicle cannot perform lane change, the network device may adjust the vehicle speeds of the first vehicle and the second vehicle. After adjusting the vehicle speeds, the first vehicle and the second vehicle send the vehicle speeds and the locations that are obtained after adjustment is performed to the network device, so that the network device continues to determine whether the first vehicle and the second vehicle satisfy a lane change condition of the first vehicle, and the network device may continuously adjust vehicle speeds of the first vehicle and the second vehicle, until the network device determines, according to vehicle speeds and locations that are of the first vehicle and the second vehicle and that are indicated by real-time information sent by the first vehicle and the second vehicle, that the first vehicle can perform lane change. Then, the network device sends the lane change indication information to the first vehicle.

In one embodiment, the method further includes: receiving, by the network device, a vehicle message sent by the first vehicle, where the vehicle message includes current geographic location information, vehicle speed information, and destination information of the first vehicle; determining, by the network device according to the current geographic location information of the first vehicle, a lane on which the first vehicle is currently located; determining, by the network device according to the lane on which the first vehicle is currently located and the destination information, that the first vehicle needs to change from the first lane to the second lane, and a lane change preparation area in which the first vehicle prepares to change from the first lane to the second lane; and sending, by the network device, a route planning message to the first vehicle, where the route planning message includes lane change information and lane change preparation area information, the lane change information is information used to indicate that when driving from the current geographic location to the destination, the first vehicle needs to change from the first lane to the second lane, and the lane change preparation area information is used to indicate a location of the lane change preparation area; and the receiving, by a network device, lane change request information sent by a first vehicle includes: receiving, by the network device, the lane change request information that is sent by the first vehicle when the first vehicle enters the lane change preparation area according to the route planning message.

It should be understood that, the network device may determine, according to the vehicle message sent by the first vehicle, a specific lane occupied by a current location of the first vehicle, for example, may determine, by using a positioning system, the lane on which the first vehicle is located. Similarly, the network device may also determine, according to a precise geographic location of a destination that is sent by the first vehicle, a lane on which the location of the destination is located, so as to: determine a specific route for the first vehicle to drive to the destination and whether the first vehicle needs to perform lane change, and when the first vehicle needs to perform lane change, send the lane change information, to indicate that the first vehicle needs to perform lane change.

It should be understood that, the network device may determine, according to a preset value, the lane change preparation area in which the first vehicle prepares to perform lane change. The preset value may be preset. For example, the lane change preparation area may be set to 500 meters, so that when a distance between the first vehicle and a lane change location is 500 meters, the first vehicle determines to enter the lane change preparation area. Alternatively, the network device may determine the lane change preparation area according to the vehicle speed of the first vehicle. For example, when the vehicle speed of the first vehicle is relatively high, the lane change preparation area may be relatively large and may be set to 1000 meters. When the vehicle speed of the first vehicle is relatively low, the lane change preparation area may be relatively small and may be set to 500 meters.

In one embodiment, the method further includes: receiving, by the network device, obstacle information sent by the first vehicle, where the obstacle information includes at least one of a distance between an obstacle and the first vehicle, a moving speed of the obstacle, or a location of the obstacle; and sending, by the network device, second planning information to the second vehicle according to the obstacle information, where the second planning information is used to instruct the second vehicle to avoid the obstacle or the first vehicle after the first vehicle avoids the obstacle.

It should be understood that, when coordinating a vehicle to perform lane change, the network device may further consider another factor, for example, whether there is an obstacle on the first lane on which the first vehicle is currently located and a target lane, so as to coordinate each vehicle to avoid the obstacle, and prevent a traffic accident.

According to a third aspect, a self-driving scheduling method is provided. The method includes: receiving, by a network device, obstacle information sent by a first vehicle, where the obstacle information includes at least one of a distance between an obstacle and the first vehicle, a moving speed of the obstacle, or a location of the obstacle; and sending, by the network device, second planning information to a second vehicle according to the obstacle information, where the second planning information is used to instruct the second vehicle to avoid the obstacle or the first vehicle after the first vehicle avoids the obstacle.

Therefore, according to the self-driving method in this application, the network device receives obstacle information sent by a vehicle, so that the network device can plan a manner in which vehicles cooperate with each other to avoid an obstacle. In this way, when each vehicle avoids the obstacle, a collision accident between the vehicles can be prevented, so that safer and more ordered traffic is achieved, and a traffic accident caused because another vehicle cannot coordinate and cooperate with a single vehicle during self-driving of the vehicle is prevented. Therefore, traffic safety can be greatly improved.

It should be understood that, the obstacle information may further include a size, a moving direction, and the like of the obstacle.

In one embodiment, the method further includes: sending, by the network device, first planning information to the first vehicle according to the obstacle information, where the first planning information is used to instruct the first vehicle to avoid the obstacle.

It should be understood that, the first vehicle may determine, according to the obstacle information, a time period in which the first vehicle arrives at the obstacle. When determining that the time period in which the first vehicle arrives at the obstacle is greater than or equal to a preset value, the first vehicle may send the obstacle information to the network device, so that the network device coordinates each vehicle to avoid the obstacle.

The network device receives the obstacle information, determines the first planning information for the first vehicle to avoid the obstacle, and sends the first planning information to the first vehicle.

In one embodiment, the method further includes: receiving, by the network device, third planning information sent by the first vehicle, where the third planning information is a measure to avoid the obstacle that is determined by the first vehicle according to the obstacle information; and the sending, by the network device, second planning information to a second vehicle according to the obstacle information includes: sending, by the network device, the second planning information to the second vehicle according to the third planning information and the obstacle information.

It should be understood that, the first vehicle may determine, according to the obstacle information, a time period in which the first vehicle arrives at the obstacle, and when determining that the time period in which the first vehicle arrives at the obstacle is less than a preset value, may temporarily not send the obstacle information to the network device. The first vehicle determines a policy for avoiding the obstacle, avoids the obstacle according to the policy, and sends, to the network device, the third planning information including the policy, so that the network device coordinates, according to the third planning information, another vehicle to avoid the obstacle and the first vehicle.

In one embodiment, the second planning information includes information for instructing the second vehicle to perform emergency braking, decelerate, or perform lane change.

According to a fourth aspect, a self-driving method is provided. The method includes: obtaining, by a first vehicle, obstacle information, where the obstacle information includes at least one of a distance between the obstacle and the first vehicle, a moving speed of the obstacle, or a location of the obstacle; and sending, by the first vehicle, the obstacle information to a network device, so that the network device sends second planning information to a second vehicle according to the obstacle information, where the second planning information is used to instruct the second vehicle to avoid the obstacle or the first vehicle after the first vehicle avoids the obstacle.

Therefore, according to the self-driving method in this application, when a vehicle detects an obstacle, the vehicle may send obstacle information to the network device, and the network device plans a manner in which the vehicle and another vehicle avoid the obstacle. In this way, when each vehicle avoids the obstacle, a collision accident between the vehicles can be prevented, so that safer and more ordered traffic is achieved, and a traffic accident caused because another vehicle cannot coordinate and cooperate with a single vehicle during self-driving of the vehicle is prevented. Therefore, traffic safety can be greatly improved.

It should be understood that, the obstacle information may further include a size, a moving direction, and the like of the obstacle, so that the first vehicle may determine, according to the obstacle information, a time period in which the first vehicle arrives at the obstacle, so as to determine a policy for avoiding the obstacle.

In one embodiment, the sending, by the first vehicle, the obstacle information to a network device includes: determining, by the first vehicle according to the obstacle information, a time period in which the first vehicle arrives at the obstacle; when the time period in which the first vehicle arrives at the obstacle is greater than or equal to a preset time period, sending, by the first vehicle, the obstacle information to the network device; receiving, by the first vehicle, first planning information that is sent by the network device according to the obstacle information; and avoiding, by the first vehicle, the obstacle according to the first planning information.

It should be understood that, when the first vehicle can determine, according to the obstacle information, that the time period in which the first vehicle arrives at the obstacle is greater than or equal to the preset value, the first vehicle may send the obstacle information to the network device, so that the network device coordinates each vehicle to avoid the obstacle. The first vehicle avoids the obstacle according to the first planning information sent by the network device.

In one embodiment, the first planning information includes information for instructing the first vehicle to perform emergency braking, decelerate, or perform lane change.

In one embodiment, the sending, by the first vehicle, the obstacle information to a network device includes: determining, by the first vehicle according to the obstacle information, a time period in which the first vehicle arrives at the obstacle; when the time period in which the first vehicle arrives at the obstacle is less than a preset time period, determining, by the first vehicle, third planning information according to the obstacle information; avoiding, by the first vehicle, the obstacle according to the third planning information; and sending, by the first vehicle, the obstacle information and the third planning information to the network device, so that the network device sends the second planning information to the second vehicle according to the obstacle information and the third planning information.

It should be understood that, when determining, according to the obstacle information, that the time period in which the first vehicle arrives at the obstacle is less than the preset value, the first vehicle may temporarily not send the obstacle information to the network device. The first vehicle determines a policy for avoiding the obstacle, avoids the obstacle according to the policy, and sends, to the network device, the third planning information including the policy, so that the network device coordinates, according to the third planning information, another vehicle to avoid the obstacle and the first vehicle.

In one embodiment, the avoiding, by the first vehicle, the obstacle according to the third planning information includes: performing, by the first vehicle according to the third planning information, emergency braking to avoid the obstacle, decelerating to avoid the obstacle, or performing lane change to avoid the obstacle.

According to a fifth aspect, a control apparatus for a vehicle is provided, configured to perform the method in any one of the first aspect or the possible implementations of the first aspect. Specifically, the control apparatus includes units configured to execute the method in any one of the first aspect or the possible implementations of the first aspect.

According to a sixth aspect, a network device is provided, configured to perform the method in any one of the second aspect or the possible implementations of the second aspect. Specifically, the network device includes units configured to execute the method in any one of the second aspect or the possible implementations of the second aspect.

According to a seventh aspect, a network device is provided, configured to perform the method in any one of the third aspect or the possible implementations of the third aspect. Specifically, the network device includes units configured to execute the method in any one of the third aspect or the possible implementations of the third aspect.

According to an eighth aspect, a control apparatus for a vehicle is provided, configured to perform the method in any one of the fourth aspect or the possible implementations of the fourth aspect. Specifically, the control apparatus includes units configured to execute the method in any one of the fourth aspect or the possible implementations of the fourth aspect.

According to a ninth aspect, a control apparatus for a vehicle is provided, including: a memory and a processor, where the memory is configured to store an instruction, the processor is configured to execute the instruction stored in the memory, and the execution of the instruction stored in the memory enables the processor to execute the method in any one of the first aspect or the possible implementations of the first aspect.

According to a tenth aspect, a network device is provided, including: a memory and a processor, where the memory is configured to store an instruction, the processor is configured to execute the instruction stored in the memory, and the execution of the instruction stored in the memory enables the processor to execute the method in any one of the second aspect or the possible implementations of the second aspect.

According to an eleventh aspect, a network device is provided, including: a memory and a processor, where the memory is configured to store an instruction, the processor is configured to execute the instruction stored in the memory, and the execution of the instruction stored in the memory enables the processor to execute the method in any one of the third aspect or the possible implementations of the third aspect.

According to a twelfth aspect, a control apparatus for a vehicle is provided, including: a memory and a processor, where the memory is configured to store an instruction, the processor is configured to execute the instruction stored in the memory, and the execution of the instruction stored in the memory enables the processor to execute the method in any one of the fourth aspect or the possible implementations of the fourth aspect.

According to a thirteenth aspect, a computer readable medium is provided, configured to store a computer program, where the computer program includes an instruction for executing the method in any one of the first aspect or the possible implementations of the first aspect.

According to a fourteenth aspect, a computer readable medium is provided, configured to store a computer program, where the computer program includes an instruction for executing the method in any one of the second aspect or the possible implementations of the second aspect.

According to a fifteenth aspect, a computer readable medium is provided, configured to store a computer program, where the computer program includes an instruction for executing the method in any one of the third aspect or the possible implementations of the third aspect.

According to a sixteenth aspect, a computer readable medium is provided, configured to store a computer program, where the computer program includes an instruction for executing the method in any one of the fourth aspect or the possible implementations of the fourth aspect.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show only some embodiments of the present invention, and a person of ordinary skill in the art may still derive other drawings from these accompanying drawings without creative efforts.

DESCRIPTION OF EMBODIMENTS

Figure 1:
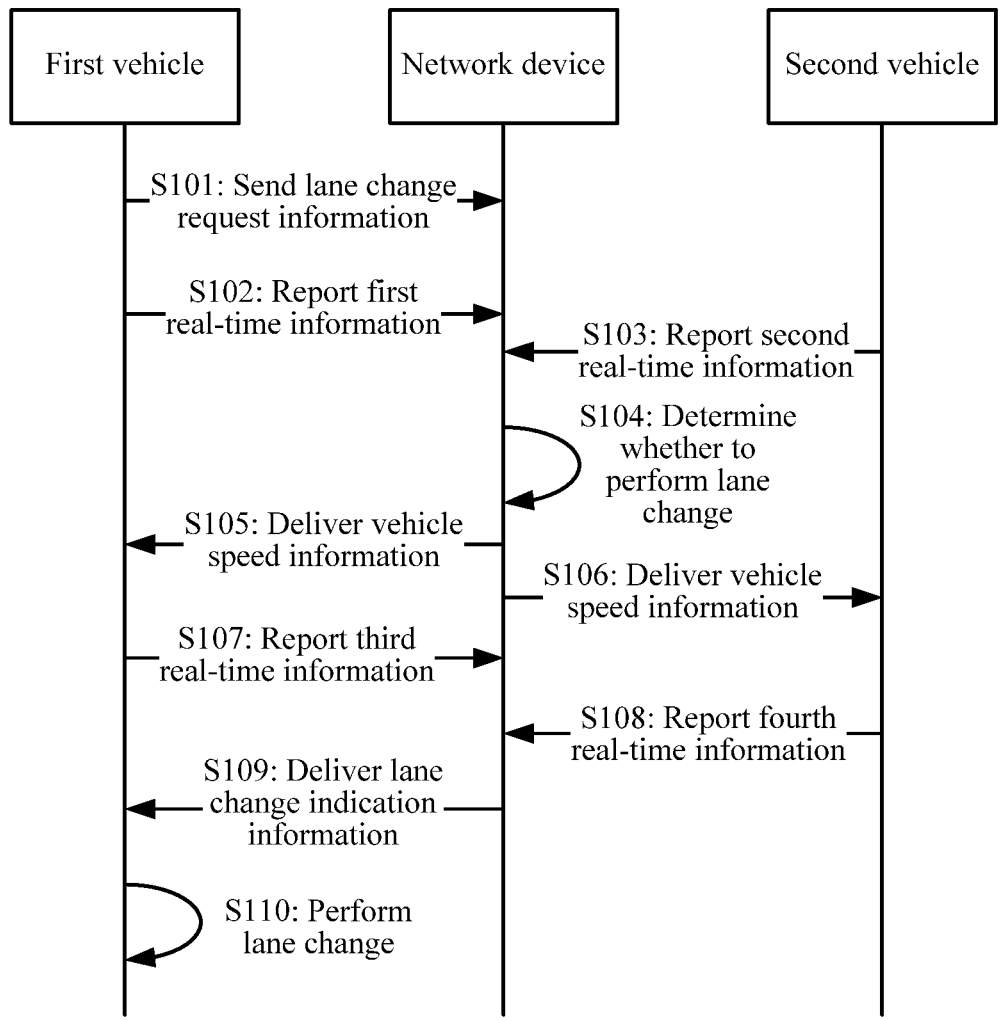
FIG. 1 is a schematic flowchart of a self-driving method according to an embodiment of the present invention.

The following clearly describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

The prior art is mainly based on an intelligent self-driving solution of a single vehicle, that is, sensing, decision-making, and control are all completed in the vehicle. Specifically, for example, an external environment sensing subsystem may collect information about the vehicle and an ambient environment; a planning and decision-making subsystem plans a driving route according to data collected by the environment sensing subsystem, and sends a control instruction to a motion control subsystem; and the motion control subsystem receives a control command from the planning and decision-making subsystem, and controls the vehicle to perform a corresponding operation.

For example, when each vehicle needs to perform lane change, each vehicle can determine a distance between a vehicle on an adjacent lane and the vehicle by using only a sensor (such as a visual sensor, a millimeter-wave radar, or a laser radar) of the vehicle. Consequently, the following problem may occur: The vehicle determines, according to the distance to the vehicle on the adjacent lane, that lane change can be performed, and performs a lane change operation, but a vehicle behind on the adjacent lane does not know that the vehicle is performing lane change, and a collision accident may occur if the vehicle behind on the adjacent lane abruptly accelerates. Alternatively, the vehicle determines, according to the distance to the vehicle on the adjacent lane, that lane change can be performed, and performs a lane change operation, but a vehicle in front on the adjacent lane does not know that the vehicle is performing lane change, and a collision accident may occur if the vehicle in front on the adjacent lane abruptly decelerates. Alternatively, if vehicles on the adjacent lane are dense, and a distance requirement for lane change cannot be satisfied, the vehicle can never perform lane change, and consequently misses an exit, or a rear-ending accident occurs because the vehicle brakes on a current lane.

Because an existing vehicle senses an ambient environment always by means of a sensor, an obtained range is basically from 50 meters to 200 meters, and there is no blocking. For example, when a first vehicle is faulty, emergency stop occurs. A second vehicle takes an emergency braking measure only after a sensor of the second vehicle detects that the vehicle in front brakes. Because a sensor of a third vehicle cannot detect a fault of the first vehicle by using the second vehicle, the third vehicle takes a braking measure only after the sensor of the third vehicle detects that a vehicle speed of the second vehicle is decreased. An interval exists between a time point at which the second vehicle prepares to take the braking measure and a time point at which a braking force is generated, and is less than 600 ms as specified in the national standard, that is, each vehicle behind brakes at least 600 ms later than a front vehicle does. That is, vehicles behind a faulty vehicle take an emergency braking measure serially. Consequently, a rear-ending risk is relatively high. In addition, a disadvantage of the sensor also determines a self-driving disadvantage. For example, accurate sensing of the sensor is affected due to weather such as rain, snow, fog, or haze, causing an unsafe factor. Consequently, a traffic accident occurs. Therefore, embodiments of the present invention provide a self-driving method, so as to improve a driving order and driving safety of a self-driving vehicle.

FIG. 1 is a schematic flowchart of a self-driving method 100 according to an embodiment of the present invention. As shown in FIG. 1, the method 100 may be applied to a scenario in which a vehicle performs lane change. Specifically, the method 100 includes the following operations.

Operation S101: When a first vehicle needs to change from a first lane to a second lane, the first vehicle sends lane change request information to a network device, where the lane change request information is used to request to change from the first lane to the second lane.

It should be understood that, the network device may be a server or may be a roadside device. The first vehicle may be any vehicle driving on a road. The first vehicle may be a self-driving vehicle or a manned driving vehicle. The first vehicle is connected to the network device, may perform information exchange with the network device, and may drive according to indication information or a message that is delivered by the network device, or may plan a driving route and a driving manner of the first vehicle by combining information or a message that is sent by the network device and a current vehicle status of the first vehicle. Optionally, self-driving or manned driving may be used in a driving process of the first vehicle. When manned driving is used, the first vehicle or the network device plans a vehicle speed and a route, and a driver performs a specific operation and action.

In this embodiment of the present invention, when entering a lane change preparation area, the first vehicle may send the lane change request information to the network device, to request to change from the first lane to the second lane. The first lane may be a lane on which the first vehicle is currently located, and the second lane is a target lane, and may be located on the left or the right of the first lane. Optionally, the lane change preparation area may be determined by the network device according to a vehicle message sent by the first vehicle.

In one embodiment, the first vehicle may send the vehicle message of the first vehicle to the network device. The vehicle message may include current geographic location information of the first vehicle, vehicle speed information indicating a current vehicle speed of the first vehicle, and geographic location information of a destination that the first vehicle needs to drive to. The current geographic location information of the first vehicle is a current geographic location of the first vehicle, and may be a precise geographic location, for example, latitude and longitude of the first vehicle, of the first vehicle determined by the first vehicle with an in-vehicle terminal and a satellite or another device. The precise geographic location may be a sub-meter level location, so that the network device can determine, according to the current geographic location information of the first vehicle, the lane on which the first vehicle is currently located. Similarly, the destination information sent by the first vehicle to the network device may also be a precise geographic location, for example, a specific latitude and longitude location, so that the network device can determine, according to the destination information, a route for the first vehicle to drive to the destination.

In one embodiment, the network device may determine a route planning message for the first vehicle according to the vehicle message sent by the first vehicle. Optionally, the route planning message may include a driving route of the first vehicle, for example, route indication information similar to a navigation route in the prior art. Alternatively, different from the prior art, the driving route may be accurate to a lane level, that is, includes a lane occupied by the first vehicle during driving to the destination. The route planning message may further include lane change information and lane change preparation area information. The lane change information is used to indicate that when driving from the current location to the destination, the first vehicle needs to change from the first lane to the second lane. The lane change preparation area information is a location of an area in which the first vehicle prepares to perform lane change.

In one embodiment, the network device may determine, according to the current location of the first vehicle and the location of the destination, whether the first vehicle needs to perform lane change. For example, when approaching an intersection, the first vehicle needs to drive to a lane (such as a left-turn lane, a right-turn lane, or a through lane) corresponding to a direction of the destination, and needs to perform lane change. Alternatively, when the network device determines, according to traffic information, that a lane needs to be temporarily closed when a situation such as an accident, congestion, control, or construction occurs on the lane, but the first vehicle passes through the lane, the network device may plan that the first vehicle needs to drive to another lane to perform lane change.

After determining that the first vehicle needs to perform lane change, the network device may determine, according to the vehicle speed of the first vehicle, the location of the lane change preparation area in which the first vehicle prepares to perform lane change. The lane change preparation area is an area in which the first vehicle makes lane change preparation within a particular distance in advance before the first vehicle arrives at a planned lane change location, and the distance may be a fixed distance, or may be a variable distance that is calculated according to a road condition, practical experience, or the like. For example, the network device may determine, according to the current vehicle speed of the first vehicle, that an area within a distance of 600 meters to a location at which the first vehicle performs lane change is the lane change preparation area, and the first vehicle may send the lane change request information to the network device when entering the 600-meter area according to the location of the lane change preparation area in the route planning message, to request to perform lane change, and the first vehicle may perform lane change after driving 600 meters.

In this embodiment of the present invention, the first vehicle sends the lane change request information to the network device. The lane change request information may include a lane change direction of the first vehicle. For example, the lane change request information may include that the first vehicle needs to change from the first lane on which the first vehicle is currently located to the second lane on the left of the first lane. The network device may determine, according to the lane change request information, that the first vehicle needs to perform lane change.

Operation S102: The first vehicle sends first real-time information to the network device, where the first real-time information includes a vehicle speed and a location of the first vehicle.

In this embodiment of the present invention, in a driving process, each vehicle connected to a network may send real-time information to the network device. For example, the first vehicle may send the first real-time information to the network device. Optionally, the real-time information may include a current vehicle speed and location of the vehicle, may further include a destination that the vehicle needs to drive to, and may further include a road condition currently obtained by the vehicle by performing detection. This embodiment of the present invention is not limited thereto. Optionally, the vehicle may be set to periodically send the real-time information to the network device, that is, the vehicle sends real-time information to the network device at regular intervals. Alternatively, the vehicle may be triggered to send the real-time information, for example, when the network device sends indication information to the vehicle, the vehicle is triggered to report real-time information. This embodiment of the present invention is not limited thereto.

In this embodiment of the present invention, the first vehicle sends the lane change request information to the network device, and may further send the first real-time information to the network device, and the first real-time information includes the vehicle speed and the location of the first vehicle, so that the network device determines, according to the first real-time information, whether the first vehicle can perform lane change or when the first vehicle performs lane change.

Operation S103: A second vehicle sends second real-time information to the network device, where the second real-time information includes a vehicle speed and a location of the second vehicle. Optionally, the second vehicle may be any vehicle different from the first vehicle.

Specifically, the network device receives the lane change request information sent by the first vehicle, and determines that the first vehicle needs to perform lane change. When the first vehicle performs lane change, another vehicle may be affected. Therefore, the network needs to control another vehicle to cooperate with the first vehicle to perform lane change, so as to prevent an accident such as a rear-end collision in a lane change process. Optionally, any vehicle different from the first vehicle may be a second vehicle, and the network device may determine, according to received real-time information sent by the different vehicle, a vehicle that is affected when the first vehicle performs lane change. When the first vehicle performs lane change, the network device needs to consider only the first vehicle and a vehicle that is affected by lane change by the first vehicle, to prevent an accident. Therefore, the network device may determine that the affected vehicle is a second vehicle, and mainly consider real-time information of the second vehicle. Optionally, when no vehicle is affected, the network device may determine that any vehicle different from the first vehicle is a second vehicle, and the second vehicle satisfies a lane change requirement of the first vehicle, or the network device may consider that no second vehicle affects lane change by the first vehicle. However, this embodiment of the present invention is not limited thereto.

Optionally, the network device may receive real-time information sent by a vehicle, and determine, according to a preset rule, that a vehicle that is affected on the first lane and the second lane by lane change by the first vehicle is a second vehicle. For example, the network device may determine, according to location information in real-time information of multiple vehicles, that on the first lane, all vehicles within a range of 500 meters behind the first vehicle are affected vehicles, that is, second vehicles. Alternatively, the network device may determine that on the second lane, all vehicles within a range of 300 meters in front of the first vehicle and all vehicles 500 meters behind the first vehicle are all affected vehicles, that is, second vehicles. Optionally, when determining an affected vehicle, the network device may further consider another factor, for example, a vehicle speed. A vehicle that is relatively far from the first vehicle and is not within a preset distance but has a relatively high vehicle speed may also be affected by lane change by the first vehicle. Therefore, the network device may determine a relative distance between another vehicle and the first vehicle according to a vehicle speed and a distance, so as to determine a second vehicle that is affected by lane change. However, this embodiment of the present invention is not limited thereto.

In this embodiment of the present invention, the network device may determine, according to real-time information sent by a vehicle, that a vehicle affected during lane change by the first vehicle is a second vehicle, and the network device receives second real-time information sent by the second vehicle. The second real-time information includes a current vehicle speed and location of the second vehicle.

Operation S104: The network device determines, according to the first real-time information sent by the first vehicle and the second real-time information sent by the second vehicle, whether the first vehicle can perform lane change.

Optionally, when determining, according to the first real-time information and the second real-time information, that the first vehicle cannot perform lane change, the network device continues to perform S105. When determining, according to the first real-time information and the second real-time information, that the first vehicle can perform lane change, the network device may directly perform S109.

In one embodiment, the network device may determine, according to the current locations and vehicle speeds of the first vehicle and the second vehicle, whether the first vehicle can perform lane change. The second vehicle may be a vehicle that is affected by lane change by the first vehicle. For example, the network device may first determine whether the vehicle speed of the first vehicle satisfies the lane change requirement, and if the vehicle speed exceeds a preset value, determine that the first vehicle cannot perform lane change. Similarly, the network device also needs to determine whether the vehicle speed of the second vehicle satisfies the lane change requirement of the first vehicle. If the vehicle speed exceeds a preset value, the first vehicle cannot perform lane change either. In addition, the network device further needs to determine whether a distance between a vehicle in front of a location of the second vehicle on the second lane relative to the first vehicle and a vehicle following the location satisfies the first vehicle when the first vehicle changes to the second lane, that is, whether there is lane change space that is greater than a preset value and that can be used for performing lane change by the first vehicle. If there is lane change space, the first vehicle can perform lane change; or If there is no lane change space, the first vehicle cannot perform lane change. The preset value of the lane change space may be set according to an actual situation.

Optionally, if there is no another vehicle on the first lane or the second lane or another vehicle is sufficiently far from the first vehicle and does not affect lane change by the first vehicle, the network device may determine that the first vehicle can perform lane change.

Operation S105: The network device determines first vehicle speed information according to the first real-time information sent by the first vehicle and the second real-time information sent by the second vehicle, and sends the first vehicle speed information to the first vehicle, where the first vehicle speed information is used to instruct the first vehicle to adjust the vehicle speed to a first vehicle speed, so that the first vehicle can perform lane change. Similarly, in operation S106: The network device may further determine second vehicle speed information according to the first real-time information sent by the first vehicle and the second real-time information sent by the second vehicle, and send the second vehicle speed information to the second vehicle, where the second vehicle speed information is used to instruct the second vehicle to adjust the vehicle speed to a second vehicle speed, so that the second vehicle can cooperate with the first vehicle to perform lane change.

In one embodiment, when the network device determines, according to the first real-time information of the first vehicle and the second real-time information of the second vehicle, that the first vehicle cannot perform lane change, the network device needs to re-plan vehicle speeds of the first vehicle and the second vehicle. To prevent an accident, when the first vehicle performs lane change, the vehicle speed cannot be excessively high, and similarly, the vehicle speed of the second vehicle cannot be excessively high either. The network device may plan vehicle speeds of the first vehicle and the second vehicle according to an actual situation, so that the vehicle speeds of the first vehicle and the second vehicle satisfy preset conditions, and send adjusted vehicle speeds to the first vehicle and the second vehicle.

For example, when the vehicle speed of the first vehicle is excessively high, the network device may plan the first vehicle speed satisfying a condition, and send the first vehicle speed information to the first vehicle. The first vehicle speed information is used to instruct the first vehicle to adjust the vehicle speed to the first vehicle speed, so as to satisfy a lane change condition.

For another example, when the vehicle speed of the second vehicle is excessively high, the network device may plan, according to an actual lane change requirement, the second vehicle speed satisfying a condition, and send the second vehicle speed information to the second vehicle. The second vehicle speed information is used to instruct the second vehicle to adjust the vehicle speed to the second vehicle speed, so as to satisfy a lane change condition. When there are multiple second vehicles, the network device may plan a vehicle speed of each vehicle, and deliver the planned vehicle speed to each corresponding vehicle, so that each vehicle can adjust a vehicle speed to a vehicle speed satisfying a condition, to facilitate lane change by the first vehicle.

Operation S107: The first vehicle sends third real-time information to the network device, where the third real-time information includes a vehicle speed and a location of the first vehicle that are obtained after the first vehicle adjusts the vehicle speed according to the first vehicle speed information.

In one embodiment, the first vehicle receives the first vehicle speed information sent by the network device, and adjusts the vehicle speed of the first vehicle according to the first vehicle speed information. For example, the first vehicle may first generate a related parameter according to the first vehicle speed information, and control a device such as an accelerator, a brake, steering, a lamp, or a vehicle horn of the vehicle, so that the vehicle continuously performs fitting on an execution vehicle speed, to adjust the vehicle speed of the first vehicle to the first vehicle speed. After adjusting the vehicle speed, the first vehicle sends the third real-time information to the network device. The third real-time information includes the adjusted vehicle speed and the location obtained after the first vehicle adjusts the vehicle speed.

Similarly, in operation S108: The second vehicle sends fourth real-time information to the network device, where the fourth real-time information includes a vehicle speed and a location of the second vehicle that are obtained after the second vehicle adjusts the vehicle speed according to the second vehicle speed information.

In one embodiment, the second vehicle receives the second vehicle speed information sent by the network device, and adjusts the vehicle speed of the second vehicle according to the second vehicle speed information. For example, the second vehicle may first generate a related parameter according to the second vehicle speed information, and control a device such as an accelerator, a brake, steering, a lamp, or a vehicle horn of the vehicle, so that the vehicle continuously performs fitting on an execution vehicle speed, to adjust the vehicle speed of the second vehicle to the second vehicle speed. After adjusting the vehicle speed, the second vehicle sends the fourth real-time information to the network device. The fourth real-time information includes the adjusted vehicle speed and the location obtained after the second vehicle adjusts the vehicle speed.

It should be understood that, in operations S107 and S108, that is, in a process in which the first vehicle receives the first vehicle speed information and adjusts the vehicle speed, and in a process in which the second vehicle receives the second vehicle speed information and adjusts the vehicle speed, the first vehicle and the second vehicle may further determine, with reference to current vehicle statuses, whether to adjust the vehicle speeds and how to adjust the vehicle speeds.

Specifically, in a driving process, a vehicle may continuously obtain an ambient condition of the vehicle by using a radar, a sensor, or another device, for example, whether there is an obstacle, and a location, a speed, a size, and the like of the obstacle, so as to prevent the vehicle from colliding with the obstacle without a network connection attribute. The obstacle may be a big rock, a pedestrian, a manned driving vehicle without an Internet connection, or the like, so as to ensure driving safety of the vehicle.

Therefore, when the vehicle does not scan an obstacle that can lead to a danger, for example, when there is no obstacle around, when there is no obstacle that is relatively close, or when there is no obstacle of a very high speed, the first vehicle may adjust the vehicle speed according to a planned route and a planned vehicle speed that are delivered by the network device, that is, the first vehicle adjusts the vehicle speed according to the first vehicle speed information.

However, if the vehicle scans a dangerous obstacle and has no time to report obstacle information to the network device and request planning, the vehicle may perform self-driving based on determining of the vehicle. For example, when adjusting the vehicle speed, if the first vehicle detects an obstacle and has no time to report obstacle information to the network device for planning, the first vehicle may not adjust the vehicle speed according to the first vehicle speed information, but performs emergency processing based on planning of the first vehicle, for example, may perform emergency braking, may decelerate, or may perform lane change. After performing emergency processing, the first vehicle may send a processing result to the network device. For example, the first vehicle may send, to the network device, information such as a vehicle speed of the first vehicle and a location of the first vehicle that are obtained after emergency processing is performed.

Alternatively, if the vehicle scans an obstacle that may be dangerous and has enough time to report obstacle information to the network device, the vehicle may report the obstacle information to the network device, wait for planning of the network device, and avoid the obstacle according to planning delivered by the network device. For example, if the first vehicle receives first vehicle speed information but scans an obstacle in front, the first vehicle may first send obstacle information to the network device, and the network re-plans a vehicle speed and a driving route of the first vehicle according to the obstacle information, and sends the planned vehicle speed and route to the first vehicle, so that the first vehicle avoids the obstacle and drives according to the re-planned vehicle speed and route, but no longer executes the instruction of the first vehicle speed information. Similarly, the network device may also re-plan a vehicle speed and a route for the second vehicle according to the obstacle information, so that the second vehicle avoids the obstacle or avoids the first vehicle, to prevent a collision.

Operation S109: When determining, according to information about the vehicle speeds and the locations of the first vehicle and the second vehicle, that the first vehicle can change from the first lane to the second lane, the network device sends lane change indication information to the first vehicle, to instruct the first vehicle to perform lane change.

In one embodiment, when determining, according to the real-time information of the first vehicle and the second vehicle, that the first vehicle and the second vehicle both satisfy the lane change conditions, the network device may send the lane change indication information to the first vehicle, to indicate that the first vehicle can change from the first lane to the second lane.

In one embodiment, when determining, according to the first real-time information sent by the first vehicle and the second real-time information of the second vehicle, that the first vehicle can perform lane change, the network device may send the lane change indication information to the first vehicle. The lane change indication information is used to instruct the first vehicle to change from the first lane to the second lane. Alternatively, after determining, according to the first real-time information and the second real-time information, that the first vehicle cannot perform lane change, the network device may perform vehicle speed adjustment, determine, according to the third real-time information sent after the first vehicle performs adjustment and the fourth real-time information sent after the second vehicle performs adjustment, that the first vehicle can perform lane change, and send the lane change indication information to the first vehicle. The lane change indication information is used to instruct the first vehicle to change from the first lane to the second lane. This embodiment of the present invention is not limited thereto.

In one embodiment, when determining, according to the first real-time information and the second real-time information, that the first vehicle cannot perform lane change, the network device adjusts the vehicle speeds of the first vehicle and the second vehicle. After performing adjustment, the first vehicle and the second vehicle may periodically send real-time information to the network device, or the first vehicle and the second vehicle may report real-time information to the network device after adjusted vehicle speeds are totally reached. This embodiment of the present invention is not limited thereto. The network device receives the real-time information sent by the first vehicle and the second vehicle, and sends the lane change indication information to the first vehicle after the network device determines that the first vehicle and the second vehicle satisfy the lane change condition of the first vehicle. Otherwise, the network device may continue to adjust the vehicle speeds of the first vehicle and the second vehicle.

In one embodiment, the lane change indication information may be only used to indicate that the first vehicle can perform lane change. The first vehicle determines, according to the lane change indication information with reference to current status information of the first vehicle, to change from the first lane to the second lane. The current status information may be determined according to a road condition that is obtained by the first vehicle by performing detection within a preset distance. Specifically, the lane change indication information received by the first vehicle is only used to indicate that the first vehicle can perform lane change. The first vehicle needs to detect the road condition within the preset distance, for example, whether there is an obstacle, or may obtain an execution route and an execution vehicle speed of the first vehicle after performing analyzing and decision-making by using a lane change route planning experience library stored in the first vehicle and with reference to information such as a distance to and a speed and a location of an obstacle around that is obtained by a sensor, and an experience library of a basic route and a vehicle speed required for lane change, and perform lane change according to the route and the vehicle speed.

In one embodiment, the lane change indication information may further include specific route planning, and the first vehicle may directly perform lane change according to planning information in the lane change indication information. The planning information may include a vehicle speed and a lane change route, and the first vehicle does not need to plan a vehicle speed and a route.

Operation S110: The first vehicle changes from the first lane to the second lane according to the lane change indication information sent by the network device.

In one embodiment, the first vehicle determines, according to the lane change indication information, that the first vehicle can change from the first lane to the second lane, and perform lane change. The first vehicle may determine, according to a high-precision location of the first vehicle and a driving route execution status, whether the first vehicle has completed lane change and drives to the target lane. Similarly, the network device may also determine, according to the obtained high-precision location of the first vehicle, that the first vehicle has driven on the target lane, and the first vehicle does not need to perform reporting. Alternatively, the network device receives real-time information that is sent by the first vehicle after lane change, and determines that the first vehicle has performed lane change.

In this embodiment of the present invention, after determining that the first vehicle has completed lane change, the network device may adjust vehicle speeds of affected vehicles, that is, second vehicles, on an original lane (the first lane) and the target lane (the second lane) back to normal vehicle speeds, to ensure entire traffic efficiency.

It should be understood that sequence numbers of the foregoing processes do not mean execution sequences in various embodiments of the present invention. The execution sequences of the processes should be determined according to functions and internal logic of the processes, and should not be construed as any limitation to the implementation processes of the embodiments of the present invention.

Therefore, according to the self-driving method in this embodiment of the present invention, in an application scenario of lane change, information exchange can be implemented between vehicles by using the network device, and a vehicle that does not need to perform lane change coordinates with a vehicle that needs to perform lane change to perform lane change, so that safer and more ordered traffic can be achieved, and a traffic accident caused because another vehicle cannot coordinate and cooperate with a single vehicle during self-driving of the vehicle is prevented. Therefore, traffic safety can be greatly improved. In addition, a vehicle that performs lane change may further determine, with reference to current vehicle status information or road condition information, whether to perform lane change or how to perform lane change, so that the vehicle that performs lane change is safer.

The self-driving method according to this embodiment of the present invention is described in detail above from the perspective of the application scenario of lane change with reference to FIG. 1. A self-driving method according to an embodiment of the present invention is described below from the perspective of an application scenario of avoiding an obstacle with reference to FIG. 2.

Figure 2:
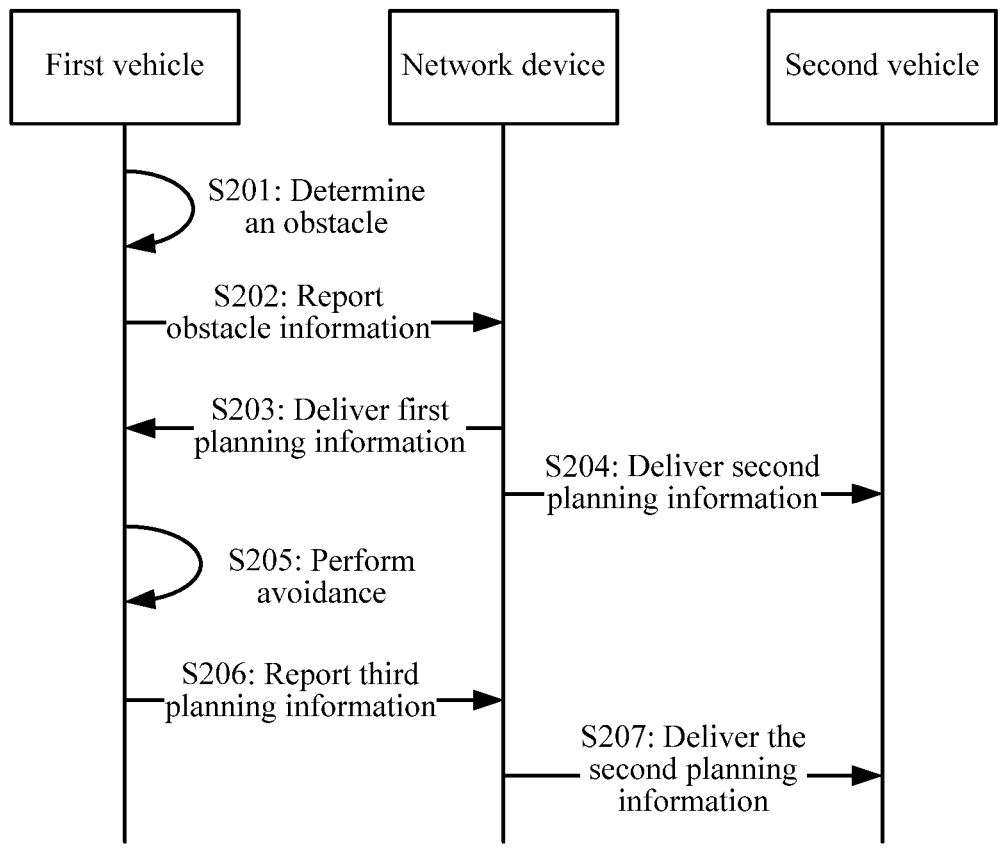
FIG. 2 is another schematic flowchart of a self-driving method according to an embodiment of the present invention.

FIG. 2 is a schematic flowchart of a self-driving method 200 according to an embodiment of the present invention. As shown in FIG. 2, the method is applied to a scenario in which a vehicle avoids an obstacle. Specifically, the method 200 includes the following operations.

Operation S201: A first vehicle detects an obstacle, and determines obstacle information.

In this embodiment of the present invention, the first vehicle may further determine, according to the obstacle information, a time period in which the first vehicle arrives at the obstacle. When determining that the time period in which the first vehicle arrives at the obstacle is greater than or equal to a preset value, the first vehicle continues to perform operation S202. When determining that the time period in which the first vehicle arrives at the obstacle is less than a preset value, the first vehicle directly performs S205.

It should be understood that, the first vehicle may be any vehicle driving on a road. The first vehicle may be a self-driving vehicle or a manned driving vehicle. The first vehicle is connected to a network device, may perform information exchange with the network device, and may drive according to indication information or a message that is delivered by the network device, or may plan a driving route and a driving manner of the first vehicle by combining information or a message that is sent by the network device and a current vehicle status of the first vehicle. Optionally, self-driving or manned driving may be used in a driving process of the first vehicle. When manned driving is used, the first vehicle or the network device plans a vehicle speed and a route, and a driver performs a specific operation and action.

In this embodiment of the present invention, within a preset distance around the first vehicle, the first vehicle may detect, by using a radar, a sensor, or another device of the first vehicle, whether there is an obstacle. The obstacle may be a big rock, a pedestrian, a manned driving vehicle without an Internet connection, or the like. The preset distance may be set according to an actual situation, and the preset distance may be determined according to a furthest range that can be detected by the first vehicle. In addition, a range that can be detected by the first vehicle is further limited by a related detection apparatus on the first vehicle.

In this embodiment of the present invention, after detecting the obstacle, the first vehicle determines the obstacle information. The obstacle information may include a location of the obstacle, for example, a current straight-line distance between the obstacle and the first vehicle, and a direction of the obstacle relative to the first vehicle. The obstacle information may further include a speed of the obstacle, for example, whether the obstacle is still, that is, whether the speed is 0. If the obstacle is moving, a moving speed and a moving direction of the obstacle may be detected. The obstacle information may further include a size of the obstacle or other related information. This embodiment of the present invention is not limited thereto.

In this embodiment of the present invention, the first vehicle may determine, according to the obstacle information, the time period in which the first vehicle arrives at the obstacle. Specifically, the first vehicle determines obstacle information. The obstacle information may include the location and the speed of the obstacle, and the first vehicle may calculate, according to the location and the speed of the obstacle and a current location and speed of the first vehicle, the time period in which the first vehicle arrives at the obstacle.

In this embodiment of the present invention, when the first vehicle determines that the time period in which the first vehicle arrives at the obstacle is less than the preset value, that is, when there is no enough time for the first vehicle to report the obstacle information to the network device and receive planning information sent by the network device, the first vehicle determines planning information according to the obstacle information, and avoids the obstacle, that is, directly performs operation S205. When the first vehicle determines that the time period in which the first vehicle arrives at the obstacle is greater than or equal to the preset value, that is, when there is enough time for the first vehicle to report the obstacle information to the network device, the first vehicle may send the obstacle information to the network device, so that the network device plans that the first vehicle avoids the obstacle, that is, the first vehicle continues to perform operation S202.

In this embodiment of the present invention, the preset time period may be set according to an actual situation, for example, the preset time period may be determined according to a total time period required for the first vehicle to send information to the network device and for the network device to perform planning and information feedback, so that the preset time period satisfies a condition for the first vehicle to report the obstacle information.

Operation S202: The first vehicle sends the obstacle information to a network device.

In one embodiment, when the first vehicle determines that the time period in which the first vehicle arrives at the obstacle is greater than or equal to the preset value, that is, when there is enough time for the first vehicle to report the obstacle information to the network device, the first vehicle may report the determined obstacle information to the network device, so that the network device performs planning.

Operation S203: The network device sends first planning information to the first vehicle according to the obstacle information, where the first planning information is used to instruct the first vehicle to avoid the obstacle.

In one embodiment, the network device may determine the first planning information according to the obstacle information sent by the first vehicle. The first planning information is used to instruct the first vehicle to avoid the obstacle. The first planning information may instruct the first vehicle to perform emergency braking, decelerate, or perform lane change, so as to avoid the obstacle.

In one embodiment, the first planning information may include only a measure for instructing the first vehicle to avoid the obstacle, and a specific execution vehicle speed or route may be determined by the first vehicle according to detected surrounding road condition information. For example, the first planning information indicates that the first vehicle can decelerate to avoid the obstacle. However, the first planning information does not include a specific vehicle speed value. The first vehicle may determine, according to actual road condition information, a vehicle speed obtained after the deceleration. Optionally, the first vehicle may further send a specific implementation status of avoiding the obstacle to the network device, so that the network device coordinates and manages another vehicle to performing avoidance, for example, the first vehicle decelerates to avoid the obstacle and may send the vehicle speed obtained after the deceleration to the network device.

In one embodiment, the first planning information may further include a specific execution vehicle speed or route for instructing the first vehicle to avoid the obstacle. For example, the first planning information may instruct the first vehicle to perform lane change to avoid the obstacle. In addition, the first planning information further indicates a time point, a vehicle speed, and a route for performing lane change by the first vehicle, so that the first vehicle may avoid the obstacle according to the first planning information.

Operation S204: The network device sends second planning information to a second vehicle according to the obstacle information, where the second planning information is used to instruct the second vehicle to avoid the obstacle or the first vehicle after the first vehicle avoids the obstacle.

In one embodiment, the network device determines the first planning information of the first vehicle according to the obstacle information. When the first vehicle avoids the obstacle, normal driving of another vehicle may be affected. For example, if the first vehicle performs emergency braking, another vehicle behind the first vehicle may be affected, and a rear-end collision may occur. Alternatively, the obstacle may be a moving obstacle, the obstacle moves to another location after the first vehicle avoids the obstacle, and a vehicle at the another location also needs to avoid the obstacle. Therefore, the network device may determine the second planning information according to the obstacle information or according to the first planning information determined for the first vehicle. The second planning information is used to instruct the second vehicle to avoid the obstacle or the first vehicle after the first vehicle avoids the obstacle.

It should be understood that, the second vehicle may be any vehicle different from the first vehicle, and the second vehicle may be affected by avoiding the obstacle by the first vehicle, or affected by the obstacle. Therefore, the second vehicle may avoid the obstacle or the first vehicle according to the second planning information.

In one embodiment, the second planning information may include a measure for instructing the second vehicle to avoid the obstacle or the first vehicle. For example, the second planning information may instruct the second vehicle to perform emergency braking, decelerate, or perform lane change, so as to avoid the obstacle or the first vehicle.

In one embodiment, the second planning information may further include specific information such as a vehicle speed or a route during avoidance. The second vehicle may determine, according to the second planning information, a manner of avoiding the obstacle or the first vehicle. A specific execution policy may be indicated by the second planning information sent by the network device, or the second vehicle may formulate a specific execution policy, for example, an execution vehicle speed and an execution route, according to current vehicle status information, and avoid the obstacle and the first vehicle. This embodiment of the present invention is not limited thereto.

Operation S205: The first vehicle avoids the obstacle.

In one embodiment, the first vehicle may avoid the obstacle according to the first planning information sent by the network device, and a procedure of avoiding the obstacle ends. Alternatively, after avoiding the obstacle, the first vehicle sends real-time information of the first vehicle to the network device, so that the network device monitors the vehicle in real time. This embodiment of the present invention is not limited thereto.

In one embodiment, the first vehicle may further determine an execution avoidance policy according to the obstacle information, and continues to perform S206. Specifically, when the first vehicle determines that the time period in which the first vehicle arrives at the obstacle is less than the preset time period, that is, when there is no enough time for the first vehicle to report the obstacle information to the network device and receive planning information sent by the network device, the first vehicle may determine planning information according to the obstacle information, and avoid the obstacle.

It should be understood that, the first vehicle may perform avoidance in multiple manners, for example, decelerate to wait for the obstacle to move to another location, or perform emergency braking to prevent a collision with the obstacle, or perform lane change to avoid the obstacle. This embodiment of the present invention is not limited thereto.

Operation S206: After avoiding the obstacle, the first vehicle sends third planning information to the network device, where the third planning information is used to indicate a measure taken by the first vehicle to avoid the obstacle.

Specifically, when the time period in which the first vehicle arrives at the obstacle is less than the preset time period, there is no enough time for the first vehicle to report the obstacle information to the network device and receive planning information sent by the network device. In this case, the first vehicle may determine planning information according to the current vehicle status and the obstacle information to avoid the obstacle, and send the third planning information to the network device after the first vehicle avoids the obstacle. The third planning information is used to indicate the measure taken by the first vehicle to avoid the obstacle. For example, if the first vehicle decelerates to avoid the obstacle, the third planning information may be used to indicate that the first vehicle has decelerated to avoid the obstacle, and the third planning information may further include a vehicle speed obtained after the first vehicle decelerates, so that the network device plans for another vehicle.

Optionally, the first vehicle may further send the obstacle information to the network device.

Operation S207: The network device determines second planning information according to the third planning information sent by the first vehicle, and sends the second planning information to a second vehicle, where the second planning information is used to instruct the second vehicle to avoid the obstacle or the first vehicle after the first vehicle avoids the obstacle.

In this embodiment of the present invention, after avoiding the obstacle, the first vehicle sends the third planning information to the network device, so that the network device may determine the second planning information according to the third planning information, where the second planning information is used to instruct the second vehicle to avoid the obstacle or the first vehicle after the first vehicle avoids the obstacle, and send the second planning information to the second vehicle, to prevent the second vehicle from colliding with the first vehicle or the obstacle.

In one embodiment, the second planning information may include a specific policy for performing avoidance by the second vehicle, for example, an execution vehicle speed or an execution route. Alternatively, the second planning information may not include a specific policy, and the second vehicle determines a specific execution policy such as an execution vehicle speed or an execution route of the second vehicle according to an avoidance manner indicated by the second planning information, a current status of the second vehicle, and road condition information.

It should be understood that sequence numbers of the foregoing processes do not mean execution sequences in various embodiments of the present invention. The execution sequences of the processes should be determined according to functions and internal logic of the processes, and should not be construed as any limitation to the implementation processes of the embodiments of the present invention.

Therefore, according to the self-driving method in this embodiment of the present invention, in an application scenario in which a vehicle avoids an obstacle, when the vehicle detects the obstacle and is relatively close to the obstacle, the vehicle may perform avoidance first, and then send planning information to the network device, so that the network device coordinates, according to the obstacle and an avoidance manner of the vehicle, another vehicle to cooperate in avoiding the obstacle. When the vehicle is relatively far from the obstacle, the vehicle may send obstacle information to the network device, and the network device plans a manner in which the vehicle and another vehicle avoid the obstacle. In this way, when each vehicle avoids the obstacle, a collision accident between the vehicles can be prevented, so that safer and more ordered traffic is achieved, and a traffic accident caused because another vehicle cannot coordinate and cooperate with a single vehicle during self-driving of the vehicle is prevented. Therefore, traffic safety can be greatly improved.

The self-driving methods according to the embodiments of the present invention are described in detail above with reference to FIG. 1 and FIG. 2. Apparatuses according to the embodiments of the present invention are described below with reference to FIG. 3 to FIG. 10.

Figure 3:
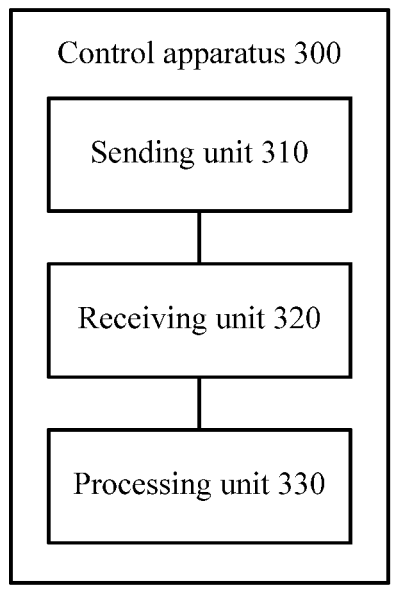
FIG. 3 is a schematic block diagram of a control apparatus for a vehicle according to an embodiment of the present invention.

FIG. 3 is a schematic block diagram of a control apparatus 300 for a vehicle according to an embodiment of the present invention. The control apparatus 300 may be installed in the vehicle, and can help the vehicle achieve a self-driving function. Specifically, as shown in FIG. 3, the control apparatus 300 for the vehicle according to this embodiment of the present invention includes:

a sending unit 310, configured to send lane change request information and first real-time information to a network device, where the lane change request information is used by the vehicle to request to change from a first lane to a second lane, and the first real-time information includes a vehicle speed and a location of the vehicle;

a receiving unit 320, configured to receive lane change indication information sent by the network device, where the lane change indication information is determined by the network device according to the first real-time information and second real-time information, the lane change indication information is a response made by the network device to the lane change request information, the second real-time information is sent by the second vehicle to the network device, the second real-time information includes a vehicle speed and a location of the second vehicle, and the lane change indication information indicates that the vehicle is allowed to perform lane change; and a processing unit 330, configured to control, according to the lane change indication information, the vehicle to change from the first lane to the second lane.

Therefore, according to the control apparatus for a vehicle in this embodiment of the present invention, in an application scenario of lane change, information exchange can be implemented between vehicles by using the network device, and a vehicle that does not need to perform lane change coordinates with a vehicle that needs to perform lane change to perform lane change, so that safer and more ordered traffic can be achieved, and a traffic accident caused because another vehicle cannot coordinate and cooperate with a single vehicle during self-driving of the vehicle is prevented. Therefore, traffic safety can be greatly improved.

In one embodiment, the receiving unit 320 is further configured to: if the network device determines, according to the first real-time information and the second real-time information, that the vehicle is not allowed to perform lane change, receive first vehicle speed information sent by the network device. The first vehicle speed information is determined by the network device according to the vehicle speeds and the locations of the vehicle and the second vehicle.

The processing unit 330 is further configured to control, according to the first vehicle speed information, the vehicle to adjust the vehicle speed to a first vehicle speed.

The sending unit 310 further configured to send third real-time information to the network device. The third real-time information includes a vehicle speed and a location of the vehicle that are obtained after the vehicle adjusts the vehicle speed according to the first vehicle speed information.

The receiving unit 320 is further configured to receive the lane change indication information sent by the network device. The lane change indication information is a response made by the network device to the lane change request information according to the third real-time information and fourth real-time information. The fourth real-time information is sent by the second vehicle to the network device. The fourth real-time information includes a vehicle speed and a location that are obtained after the second vehicle adjusts the vehicle speed according to second vehicle speed information. The second vehicle speed information is determined by the network device according to the first real-time information and the second real-time information.

In one embodiment, the sending unit 310 is further configured to send a vehicle message to the network device. The vehicle message includes current geographic location information, vehicle speed information, and destination information of the vehicle.

The receiving unit 320 is further configured to receive a route planning message that is sent by the network device according to the vehicle message. The route planning message includes lane change information and lane change preparation area information. The lane change information is used to indicate that when driving from a current geographic location to a destination, the vehicle needs to change from the first lane to the second lane. The lane change preparation area information is used to indicate a location of a lane change preparation area that is on the first lane and in which the vehicle prepares to change from the first lane to the second lane.

The sending unit 310 is further configured to: when the vehicle determines, according to the route planning message, to enter the lane change preparation area, send the lane change request information to the network device.

In one embodiment, the processing unit 330 is specifically configured to change from the first lane to the second lane according to the lane change indication information and current status information of the vehicle. The current status information is determined according to a road condition that is obtained by the vehicle by performing detection within a preset distance.

In one embodiment, the processing unit 330 is further configured to obtain obstacle information. The obstacle information includes at least one of a distance between the obstacle and the vehicle, a moving speed of the obstacle, or a location of the obstacle.

The sending unit 310 is further configured to send the obstacle information to the network device, so that the network device sends second planning information to the second vehicle according to the obstacle information. The second planning information is used to instruct the second vehicle to avoid the obstacle or the vehicle after the vehicle avoids the obstacle.

It should be understood that, the control apparatus 300 for a vehicle according to this embodiment of the present invention may correspond to a control apparatus in the first vehicle that executes the method 100 in the embodiments of the present invention, and the foregoing and other operations and/or functions of the modules in the control apparatus 300 are separately for implementing corresponding procedures of the first vehicle in the method in FIG. 1. For brevity, details are not described herein again.

Therefore, according to the control apparatus for a vehicle in this embodiment of the present invention, information exchange can be implemented between vehicles by using the network device, and a vehicle that does not need to perform lane change coordinates with a vehicle that needs to perform lane change to perform lane change, so that safer and more ordered traffic can be achieved, and a traffic accident caused because another vehicle cannot coordinate and cooperate with a single vehicle during self-driving of the vehicle is prevented. Therefore, traffic safety can be greatly improved.

Figure 4:
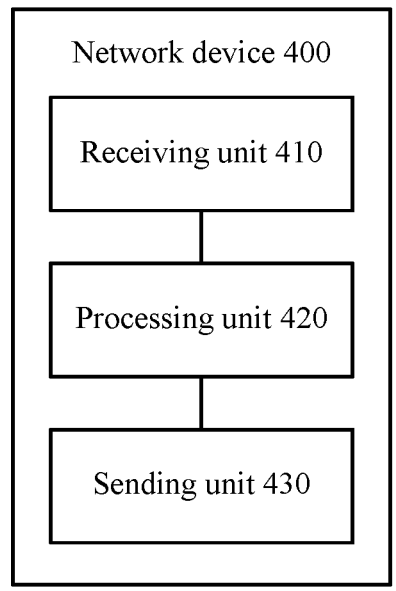
FIG. 4 is a schematic block diagram of a network device according to an embodiment of the present invention.

As shown in FIG. 4, a network device 400 according to an embodiment of the present invention includes: a receiving unit 410, a processing unit 420, and a sending unit 430.

The receiving unit 410 is configured to receive lane change request information and first real-time information that are sent by a first vehicle. The lane change request information is used by the first vehicle to request to change from a first lane to a second lane. The first real-time information includes a vehicle speed and a location of the first vehicle.

The receiving unit 410 is further configured to receive second real-time information sent by a second vehicle. The second real-time information includes a vehicle speed and a location of the second vehicle.

The processing unit 420 is configured to: determine lane change indication information according to the lane change request information, the first real-time information, and the second real-time information, and send the lane change indication information to the first vehicle by using the sending unit 430, to instruct the first vehicle to change from the first lane to the second lane.

Therefore, according to the network device in this embodiment of the present invention, information exchange can be implemented between vehicles. In an application scenario of lane change, a vehicle that does not perform lane change can coordinate with a vehicle that performs lane change to perform lane change, so that safer and more ordered traffic can be achieved, and a traffic accident caused because another vehicle cannot coordinate and cooperate with a single vehicle during self-driving of the vehicle is prevented. Therefore, traffic safety can be greatly improved.

In one embodiment, the processing unit 420 is further configured to: if determining, according to the first real-time information and the second real-time information, that the first vehicle is not allowed to perform lane change, determine first vehicle speed information of the first vehicle and second vehicle speed information of the second vehicle according to the vehicle speeds and the locations of the first vehicle and the second vehicle. The first vehicle speed information is used to instruct the first vehicle to adjust a current vehicle speed to a first vehicle speed. The second vehicle speed information is used to instruct the second vehicle to adjust a current vehicle speed to a second vehicle speed.

The sending unit 430 is further configured to: send the first vehicle speed information to the first vehicle, and send the second vehicle speed information to the second vehicle.

The receiving unit 410 is further configured to: receive third real-time information sent by the first vehicle and fourth real-time information sent by the second vehicle. The third real-time information includes a vehicle speed and a location that are obtained after the first vehicle adjusts the vehicle speed according to the first vehicle speed information. The fourth real-time information includes a vehicle speed and a location that are obtained after the second vehicle adjusts the vehicle speed according to the second vehicle speed information.

The processing unit 420 is further configured to determine the lane change indication information according to the lane change request information, the third real-time information, and the fourth real-time information.

In one embodiment, the receiving unit 410 is further configured to receive a vehicle message sent by the first vehicle. The vehicle message includes current geographic location information, vehicle speed information, and destination information of the first vehicle.

The processing unit 420 is further configured to: determine, according to the current geographic location information of the first vehicle, a lane on which the first vehicle is currently located; and determine, according to the lane on which the first vehicle is currently located and the destination information, that the first vehicle needs to change from the first lane to the second lane, and a lane change preparation area in which the first vehicle on the first lane prepares to change from the first lane to the second lane.

The sending unit 430 is further configured to send a route planning message to the first vehicle. The route planning message includes lane change information and lane change preparation area information. The lane change information is information used to indicate that when driving from the current geographic location to the destination, the first vehicle needs to change from the first lane to the second lane. The lane change preparation area information is used to indicate a location of the lane change preparation area.

The receiving unit 410 is specifically configured to receive the lane change request information that is sent by the first vehicle when the first vehicle enters the lane change preparation area according to the route planning message.

In one embodiment, the receiving unit 410 is further configured to receive obstacle information sent by the first vehicle. The obstacle information includes at least one of a distance between an obstacle and the first vehicle, a moving speed of the obstacle, or a location of the obstacle.

The sending unit 430 is further configured to send second planning information to the second vehicle according to the obstacle information. The second planning information is used to instruct the second vehicle to avoid the obstacle or the first vehicle after the first vehicle avoids the obstacle.

It should be understood that, the network device 400 according to this embodiment of the present invention may correspond to the network device in the method 100 in the embodiments of the present invention, and the foregoing and other operations and/or functions of the modules in the network device 400 are separately for implementing corresponding procedures of the network device in the method in FIG. 1. For brevity, details are not described herein again.

Therefore, according to the network device in this embodiment of the present invention, information exchange can be implemented between vehicles. In an application scenario of lane change, a vehicle that does not perform lane change can coordinate with a vehicle that performs lane change to perform lane change, and in an application scenario of avoiding an obstacle, when a vehicle avoids the obstacle, vehicles can be prevented from colliding with each other, so that safer and more ordered traffic can be achieved, and a traffic accident caused because another vehicle cannot coordinate and cooperate with a single vehicle during self-driving of the vehicle is prevented. Therefore, traffic safety can be greatly improved.

Figure 5:
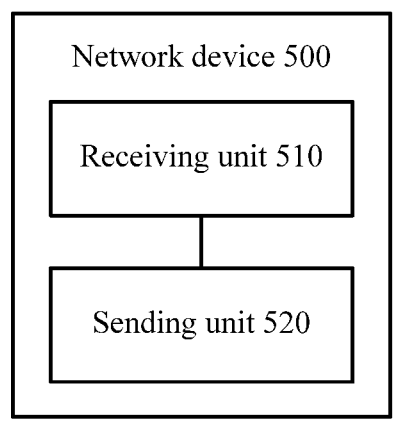
FIG. 5 is a schematic block diagram of a network device according to another embodiment of the present invention.

As shown in FIG. 5, a network device 500 according to an embodiment of the present invention includes:

a receiving unit 510, configured to receive obstacle information sent by a first vehicle, where the obstacle information includes at least one of a distance between an obstacle and the first vehicle, a moving speed of the obstacle, or a location of the obstacle; and a sending unit 520, configured to send second planning information to a second vehicle according to the obstacle information, where the second planning information is used to instruct the second vehicle to avoid the obstacle or the first vehicle after the first vehicle avoids the obstacle.

Therefore, when the network device in this embodiment of the present invention coordinates, according to obstacle information sent by a vehicle, each vehicle to avoid an obstacle, the vehicles are prevented from colliding with each other due to avoidance of the obstacle, so that safer and more ordered traffic is achieved, and a traffic accident caused because another vehicle cannot coordinate and cooperate with a single vehicle during self-driving of the vehicle is prevented. Therefore, traffic safety can be greatly improved.

In one embodiment, the sending unit 520 is further configured to send first planning information to the first vehicle according to the obstacle information. The first planning information is used to instruct the first vehicle to avoid the obstacle.

In one embodiment, the receiving unit 510 is further configured to receive third planning information sent by the first vehicle. The third planning information is a measure to avoid the obstacle that is determined by the first vehicle according to the obstacle information. The sending unit 520 is specifically configured to send the second planning information to the second vehicle according to the third planning information and the obstacle information.

In one embodiment, the second planning information includes information for instructing the second vehicle to perform emergency braking, decelerate, or perform lane change.

It should be understood that, the network device 500 according to this embodiment of the present invention may correspond to the network device in the method 200 in the embodiments of the present invention, and the foregoing and other operations and/or functions of the modules in the network device 500 are separately for implementing corresponding procedures of the network device in the method in FIG. 2. For brevity, details are not described herein again.

Therefore, when the network device in this embodiment of the present invention coordinates, according to obstacle information sent by a vehicle, each vehicle to avoid an obstacle, the vehicles are prevented from colliding with each other due to avoidance of the obstacle, so that safer and more ordered traffic is achieved, and a traffic accident caused because another vehicle cannot coordinate and cooperate with a single vehicle during self-driving of the vehicle is prevented. Therefore, traffic safety can be greatly improved.

Figure 6:
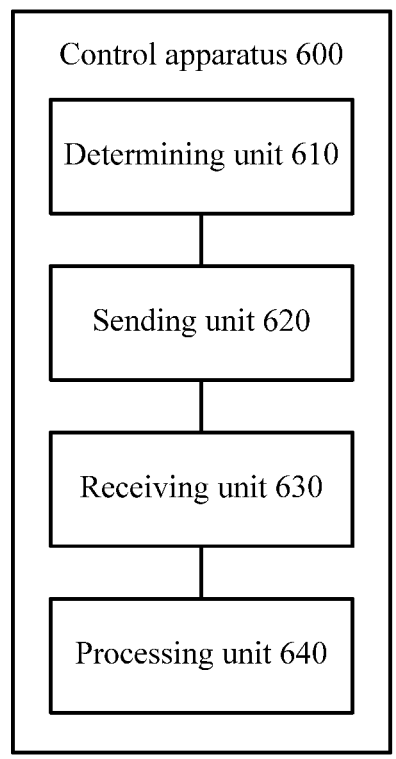
FIG. 6 is a schematic block diagram of a control apparatus for a vehicle according to another embodiment of the present invention.

FIG. 6 is a schematic block diagram of a control apparatus 600 for a vehicle according to an embodiment of the present invention. The control apparatus 600 may be installed in the vehicle. As shown in FIG. 6, the control apparatus 600 for a vehicle according to this embodiment of the present invention includes:

a determining unit 610, configured to obtain obstacle information, where the obstacle information includes at least one of a distance between the obstacle and the vehicle, a moving speed of the obstacle, or a location of the obstacle; and a sending unit 620, configured to send the obstacle information to a network device, so that the network device sends second planning information to a second vehicle according to the obstacle information, where the second planning information is used to instruct the second vehicle to avoid the obstacle or the vehicle after the vehicle avoids the obstacle.

Therefore, when detecting an obstacle and the obstacle is relatively close, the control apparatus for a vehicle in this embodiment of the present invention may control the vehicle to perform avoidance first, and then send planning information to the network device, so that the network device coordinates, according to the obstacle and an avoidance manner of the vehicle, another vehicle to cooperate in avoiding the obstacle. When the vehicle is relatively far from the obstacle, the control apparatus may control the vehicle to send obstacle information to the network device, and the network device plans a manner in which the vehicle and another vehicle avoid the obstacle. In this way, when each vehicle avoids the obstacle, a collision accident between the vehicles can be prevented, so that safer and more ordered traffic is achieved, and a traffic accident caused because another vehicle cannot coordinate and cooperate with a single vehicle during self-driving of the vehicle is prevented. Therefore, traffic safety can be greatly improved.

Optionally, the determining unit 610 is further configured to determine, according to the obstacle information, a time period in which the vehicle arrives at the obstacle.

The sending unit 620 is further configured to: when the time period in which the vehicle arrives at the obstacle is greater than or equal to a preset time period, send, by the vehicle, the obstacle information to the network device.

The vehicle further includes: a receiving unit 630, configured to receive first planning information that is sent by the network device according to the obstacle information; and a processing unit 640, configured to avoid the obstacle according to the first planning information.

Optionally, the first planning information includes information for instructing the vehicle to perform emergency braking, decelerate, or perform lane change.

Optionally, the determining unit 610 is further configured to determine, according to the obstacle information, a time period in which the vehicle arrives at the obstacle.

The determining unit 610 is further configured to: when the time period in which the vehicle arrives at the obstacle is less than a preset time period, determine third planning information according to the obstacle information.

The vehicle further includes: a processing unit 640, configured to avoid the obstacle according to the third planning information.

The sending unit 620 is further configured to send the obstacle information and the third planning information to the network device, so that the network device sends the second planning information to the second vehicle according to the obstacle information and the third planning information.

In one embodiment, the processing unit 640 is configured to: according to the third planning information, perform emergency braking to avoid the obstacle, decelerate to avoid the obstacle, or perform lane change to avoid the obstacle.

It should be understood that, the control apparatus 600 for a vehicle according to this embodiment of the present invention may correspond to a control apparatus in the first vehicle that executes the method 200 in the embodiments of the present invention, and the foregoing and other operations and/or functions of the modules in the control apparatus 600 are separately for implementing corresponding procedures of the first vehicle in the method in FIG. 2. For brevity, details are not described herein again.

Therefore, when detecting an obstacle and the obstacle is relatively close, the control apparatus for a vehicle in this embodiment of the present invention may control the vehicle to perform avoidance first, and then send planning information to the network device, so that the network device coordinates, according to the obstacle and an avoidance manner of the vehicle, another vehicle to cooperate in avoiding the obstacle. When the vehicle is relatively far from the obstacle, the control apparatus may control the vehicle to send obstacle information to the network device, and the network device plans a manner in which the vehicle and another vehicle avoid the obstacle. In this way, when each vehicle avoids the obstacle, a collision accident between the vehicles can be prevented, so that safer and more ordered traffic is achieved, and a traffic accident caused because another vehicle cannot coordinate and cooperate with a single vehicle during self-driving of the vehicle is prevented. Therefore, traffic safety can be greatly improved.

Figure 7:
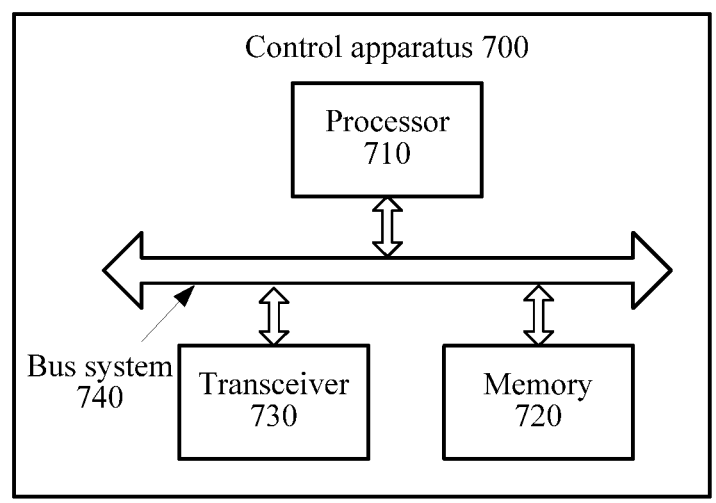
FIG. 7 is a schematic block diagram of a control apparatus for a vehicle according to another embodiment of the present invention.

As shown in FIG. 7, an embodiment of the present invention further provides a control apparatus 700 for a vehicle. The control apparatus 700 may be installed in the vehicle. The control apparatus 700 includes a processor 710, a memory 720, a transceiver 730, and a bus system 740. The processor 710, the memory 720, and the transceiver 730 are mutually connected by using the bus system 740. The memory 720 is configured to store an instruction. The processor 710 is configured to execute the instruction stored in the memory 720, to control the transceiver 730 to receive and send a signal. The transceiver 730 is configured to: send lane change request information to a network device, where the lane change request information is used by the vehicle to request to change from a first lane to a second lane; send first real-time information to the network device, where the first real-time information includes a vehicle speed and a location of the vehicle; and receive lane change indication information sent by the network device, where the lane change indication information is determined by the network device according to the first real-time information and second real-time information the lane change indication information is a response of second real-time information sent by the network device to the lane change request information, the second real-time information is sent by a second vehicle to the network device, the second real-time information includes a vehicle speed and a location of the second vehicle, and the lane change indication information indicates that the vehicle is allowed to perform lane change. The processor 710 is configured to change from the first lane to the second lane according to the lane change indication information.

Therefore, according to the control apparatus for a vehicle in this embodiment of the present invention, in an application scenario of lane change, information exchange can be implemented between vehicles by using the network device, and a vehicle that does not need to perform lane change coordinates with a vehicle that needs to perform lane change to perform lane change, so that safer and more ordered traffic can be achieved, and a traffic accident caused because another vehicle cannot coordinate and cooperate with a single vehicle during self-driving of the vehicle is prevented. Therefore, traffic safety can be greatly improved.

It should be understood that in this embodiment of the present invention, the processor 710 may be a central processing unit ("CPU" for short), or the processor 710 may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor, or the like.

The memory 720 may include a read-only memory and a random access memory, and provide an instruction and data to the processor 710. A part of the memory 720 may further include a non-volatile random access memory. For example, the memory 720 may further store device-type information.

The bus system 740 may further include a power bus, a control bus, a status signal bus, and the like in addition to a data bus. However, for clear description, various types of buses in the figure are marked as the bus system 740.

In an implementation process, operations in the foregoing methods may be completed by using an integrated logical circuit of hardware in the processor 710 or an instruction in a form of software. The steps in the methods disclosed with reference to the embodiments of the present invention may be directly performed and completed by a hardware processor, or may be performed and completed by using a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory 720, and the processor 710 reads information in the memory 720 and completes the steps in the foregoing methods in combination with hardware of the processor 710. To avoid repetition, details are not described herein again.

In one embodiment, if the network device determines, according to the first real-time information and the second real-time information, that the vehicle is not allowed to perform lane change, the transceiver 730 is further configured to receive first vehicle speed information sent by the network device. The first vehicle speed information is determined by the network device according to the vehicle speeds and the locations of the vehicle and the second vehicle. The processor 710 is further configured to adjust the vehicle speed to a first vehicle speed according to the first vehicle speed information. The transceiver 730 is further configured to send third real-time information to the network device. The third real-time information includes a vehicle speed and a location of the vehicle that are obtained after the vehicle adjusts the vehicle speed according to the first vehicle speed information. The transceiver 730 is further configured to receive the lane change indication information sent by the network device. The lane change indication information is a response made by the network device to the lane change request information according to the third real-time information and fourth real-time information, the fourth real-time information is sent by the second vehicle to the network device. The fourth real-time information includes a vehicle speed and a location that are obtained after the second vehicle adjusts the vehicle speed according to second vehicle speed information. The second vehicle speed information is determined by the network device according to the first real-time information and the second real-time information.

In one embodiment, the transceiver 730 is further configured to: send a vehicle message to the network device, where the vehicle message includes current geographic location information, vehicle speed information, and destination information of the vehicle; receive a route planning message that is sent by the network device according to the vehicle message, where the route planning message includes lane change information and lane change preparation area information, the lane change information is used to indicate that when driving from a current geographic location to a destination, the vehicle needs to change from the first lane to the second lane, and the lane change preparation area information is used to indicate a location of a lane change preparation area that is on the first lane and in which the vehicle prepares to change from the first lane to the second lane; and when the vehicle determines, according to the route planning message, to enter the lane change preparation area, send the lane change request information to the network device.

In one embodiment, the processor 710 is further configured to change from the first lane to the second lane according to the lane change indication information or the lane change indication information and current status information of the vehicle. The current status information is determined according to a road condition that is obtained by the vehicle by performing detection within a preset distance.

In one embodiment, the processor 710 is further configured to obtain obstacle information. The obstacle information includes at least one of a distance between the obstacle and the vehicle, a moving speed of the obstacle, or a location of the obstacle. The transceiver 730 is further configured to send the obstacle information to the network device, so that the network device sends second planning information to the second vehicle according to the obstacle information. The second planning information is used to instruct the second vehicle to avoid the obstacle or the vehicle after the vehicle avoids the obstacle.

It should be understood that, the control apparatus 700 for a vehicle according to this embodiment of the present invention may correspond to the control apparatus 300 for a vehicle in the embodiments of the present invention, and may correspond to a control apparatus in the first vehicle that executes the method 100 according to the embodiments of the present invention, and the foregoing and other operations and/or functions of the modules in the control apparatus 700 are separately for implementing corresponding procedures of the first vehicle in the method in FIG. 1. For brevity, details are not described herein again.

Therefore, according to the control apparatus for a vehicle in this embodiment of the present invention, information exchange can be implemented between vehicles by using the network device, and a vehicle that does not need to perform lane change coordinates with a vehicle that needs to perform lane change to perform lane change, so that safer and more ordered traffic can be achieved, and a traffic accident caused because another vehicle cannot coordinate and cooperate with a single vehicle during self-driving of the vehicle is prevented. Therefore, traffic safety can be greatly improved.

Figure 8:
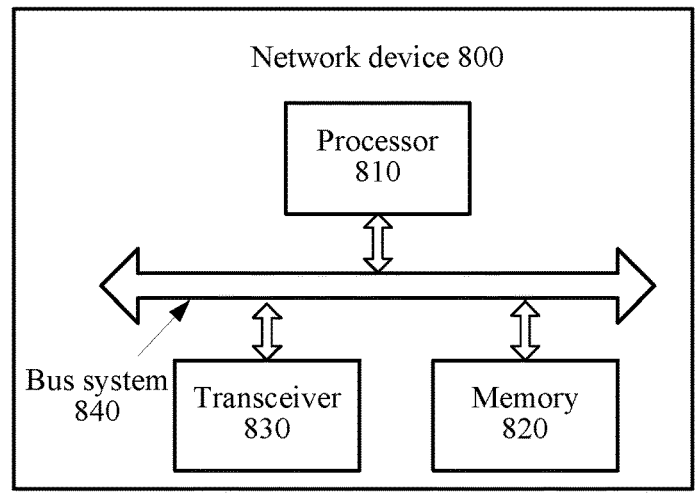
FIG. 8 is a schematic block diagram of a network device according to another embodiment of the present invention.

As shown in FIG. 8, an embodiment of the present invention further provides a network device 800. The network device 800 includes a processor 810, a memory 820, a transceiver 830, and a bus system 840. The processor 810, the memory 820, and the transceiver 830 are mutually connected by using the bus system 840. The memory 820 is configured to store an instruction. The processor 810 is configured to execute the instruction stored in the memory 820, to control the transceiver 830 to receive and send a signal. The transceiver 830 is configured to: receive lane change request information sent by a first vehicle, where the lane change request information is used by the first vehicle to request to change from a first lane to a second lane; receive first real-time information sent by the first vehicle, where the first real-time information includes a vehicle speed and a location of the first vehicle; and receive second real-time information sent by a second vehicle, where the second real-time information includes a vehicle speed and a location of the second vehicle. The processor 810 is configured to: determine lane change indication information according to the lane change request information, the first real-time information, and the second real-time information, and send the lane change indication information to the first vehicle by using the transceiver 830, to instruct the first vehicle to change from the first lane to the second lane.

Therefore, according to the network device in this embodiment of the present invention, information exchange can be implemented between vehicles. In an application scenario of lane change, a vehicle that does not perform lane change can coordinate with a vehicle that performs lane change to perform lane change, so that safer and more ordered traffic can be achieved, and a traffic accident caused because another vehicle cannot coordinate and cooperate with a single vehicle during self-driving of the vehicle is prevented. Therefore, traffic safety can be greatly improved.

It should be understood that, in this embodiment of the present invention, the processor 810 may be a CPU, or the processor 810 may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor, or the like.

The memory 820 may include a read-only memory and a random access memory, and provide an instruction and data to the processor 810. A part of the memory 820 may further include a non-volatile random access memory. For example, the memory 820 may further store device-type information.

The bus system 840 may further include a power bus, a control bus, a status signal bus, and the like in addition to a data bus. However, for clear description, various types of buses in the figure are marked as the bus system 840.

In an implementation process, steps in the foregoing methods may be completed by using an integrated logical circuit of hardware in the processor 810 or an instruction in a form of software. The steps in the methods disclosed with reference to the embodiments of the present invention may be directly performed and completed by a hardware processor, or may be performed and completed by using a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory 820, and the processor 810 reads information in the memory 820 and completes the steps in the foregoing methods in combination with hardware of the processor 810. To avoid repetition, details are not described herein again.

In one embodiment, the processor 810 is further configured to: if determining, according to the first real-time information and the second real-time information, that the first vehicle is not allowed to perform lane change, determine first vehicle speed information of the first vehicle and second vehicle speed information of the second vehicle according to the vehicle speeds and the locations of the first vehicle and the second vehicle. The first vehicle speed information is used to instruct the first vehicle to adjust a current vehicle speed to a first vehicle speed. The second vehicle speed information is used to instruct the second vehicle to adjust a current vehicle speed to a second vehicle speed.

The transceiver 830 is further configured to: send the first vehicle speed information to the first vehicle; send the second vehicle speed information to the second vehicle; receive third real-time information sent by the first vehicle, where the third real-time information includes a vehicle speed and a location that are obtained after the first vehicle adjusts the vehicle speed according to the first vehicle speed information; and receive fourth real-time information sent by the second vehicle, where the fourth real-time information includes a vehicle speed and a location that are obtained after the second vehicle adjusts the vehicle speed according to the second vehicle speed information.

The processor 810 is further configured to determine the lane change indication information according to the lane change request information, the third real-time information, and the fourth real-time information.

Optionally, the transceiver 830 is further configured to receive a vehicle message sent by the first vehicle. The vehicle message includes current geographic location information, vehicle speed information, and destination information of the first vehicle.

The processor 810 is further configured to: determine, according to the current geographic location information of the first vehicle, a lane on which the first vehicle is currently located; and determine, according to the lane on which the first vehicle is currently located and the destination information, that the first vehicle needs to change from the first lane to the second lane, and a lane change preparation area in which the first vehicle prepares to change from the first lane to the second lane.

The transceiver 830 is further configured to: send a route planning message to the first vehicle, where the route planning message includes lane change information and lane change preparation area information, the lane change information is information used to indicate that when driving from the current geographic location to the destination, the first vehicle needs to change from the first lane to the second lane, and the lane change preparation area information is used to indicate a location of the lane change preparation area; and receive the lane change request information that is sent by the first vehicle when the first vehicle enters the lane change preparation area according to the route planning message.

In one embodiment, the transceiver 830 is further configured to: receive obstacle information sent by the first vehicle, where the obstacle information includes at least one of a distance between an obstacle and the first vehicle, a moving speed of the obstacle, or a location of the obstacle; and send second planning information to the second vehicle according to the obstacle information, where the second planning information is used to instruct the second vehicle to avoid the obstacle or the first vehicle after the first vehicle avoids the obstacle.

It should be understood that, the network device 800 according to this embodiment of the present invention may correspond to the network device 400 in the embodiments of the present invention, and may correspond to the network device that executes the method 100 according to the embodiments of the present invention, and the foregoing and other operations and/or functions of the modules in the network device 800 are separately for implementing corresponding procedures of the network device in the method in FIG. 1. For brevity, details are not described herein again.

Therefore, according to the network device in this embodiment of the present invention, information exchange can be implemented between vehicles. In an application scenario of lane change, a vehicle that does not perform lane change can coordinate with a vehicle that performs lane change to perform lane change, and in an application scenario of avoiding an obstacle, when a vehicle avoids the obstacle, vehicles can be prevented from colliding with each other, so that safer and more ordered traffic can be achieved, and a traffic accident caused because another vehicle cannot coordinate and cooperate with a single vehicle during self-driving of the vehicle is prevented. Therefore, traffic safety can be greatly improved.

Figure 9:
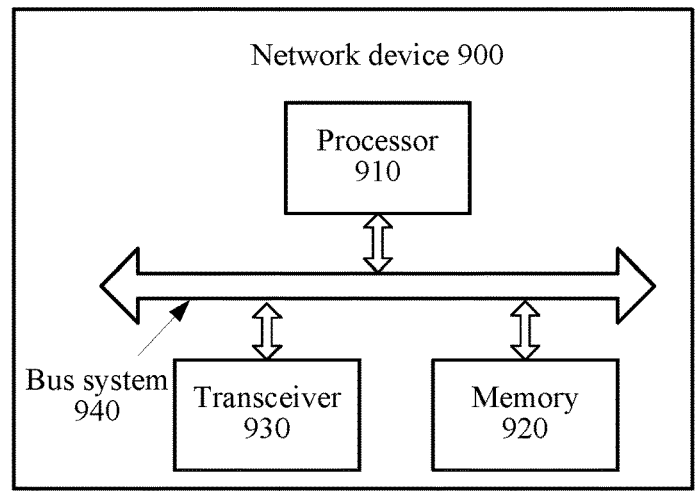
FIG. 9 is a schematic block diagram of a network device according to another embodiment of the present invention.

As shown in FIG. 9, an embodiment of the present invention further provides a network device 900. The network device 900 includes a processor 910, a memory 920, a transceiver 930, and a bus system 940. The processor 910, the memory 920, and the transceiver 930 are mutually connected by using the bus system 940. The memory 920 is configured to store an instruction. The processor 910 is configured to execute the instruction stored in the memory 920, to control the transceiver 930 to receive and send a signal. The transceiver 930 is configured to: receive obstacle information sent by a first vehicle, where the obstacle information includes at least one of a distance between an obstacle and the first vehicle, a moving speed of the obstacle, or a location of the obstacle; and send second planning information to a second vehicle according to the obstacle information, where the second planning information is used to instruct the second vehicle to avoid the obstacle or the first vehicle after the first vehicle avoids the obstacle.

Therefore, when the network device in this embodiment of the present invention coordinates, according to obstacle information sent by a vehicle, each vehicle to avoid an obstacle, the vehicles are prevented from colliding with each other due to avoidance of the obstacle, so that safer and more ordered traffic is achieved, and a traffic accident caused because another vehicle cannot coordinate and cooperate with a single vehicle during self-driving of the vehicle is prevented. Therefore, traffic safety can be greatly improved.

It should be understood that, in this embodiment of the present invention, the processor 910 may be a CPU, or the processor 910 may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor, or the like.

The memory 920 may include a read-only memory and a random access memory, and provide an instruction and data to the processor 910. A part of the memory 920 may further include a non-volatile random access memory. For example, the memory 920 may further store device-type information.

The bus system 940 may further include a power bus, a control bus, a status signal bus, and the like in addition to a data bus. However, for clear description, various types of buses in the figure are marked as the bus system 940.

In an implementation process, steps in the foregoing methods may be completed by using an integrated logical circuit of hardware in the processor 910 or an instruction in a form of software. The steps in the methods disclosed with reference to the embodiments of the present invention may be directly performed and completed by a hardware processor, or may be performed and completed by using a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory 920, and the processor 910 reads information in the memory 920 and completes the steps in the foregoing methods in combination with hardware of the processor 910. To avoid repetition, details are not described herein again.

Optionally, the transceiver 930 is further configured to send first planning information to the first vehicle according to the obstacle information. The first planning information is used to instruct the first vehicle to avoid the obstacle.

In one embodiment, the transceiver 930 is further configured to: receive third planning information sent by the first vehicle, where the third planning information is a measure to avoid the obstacle that is determined by the first vehicle according to the obstacle information; and send the second planning information to the second vehicle according to the third planning information and the obstacle information.

In one embodiment, the second planning information includes information for instructing the second vehicle to perform emergency braking, decelerate, or perform lane change.

It should be understood that, the network device 900 according to this embodiment of the present invention may correspond to the network device 500 in the embodiments of the present invention, and may correspond to the network device that executes the method 200 according to the embodiments of the present invention, and the foregoing and other operations and/or functions of the modules in the network device 900 are separately for implementing corresponding procedures of the network device in the method in FIG. 2. For brevity, details are not described herein again.

Therefore, when the network device in this embodiment of the present invention coordinates, according to obstacle information sent by a vehicle, each vehicle to avoid an obstacle, the vehicles are prevented from colliding with each other due to avoidance of the obstacle, so that safer and more ordered traffic is achieved, and a traffic accident caused because another vehicle cannot coordinate and cooperate with a single vehicle during self-driving of the vehicle is prevented. Therefore, traffic safety can be greatly improved.

Figure 10:
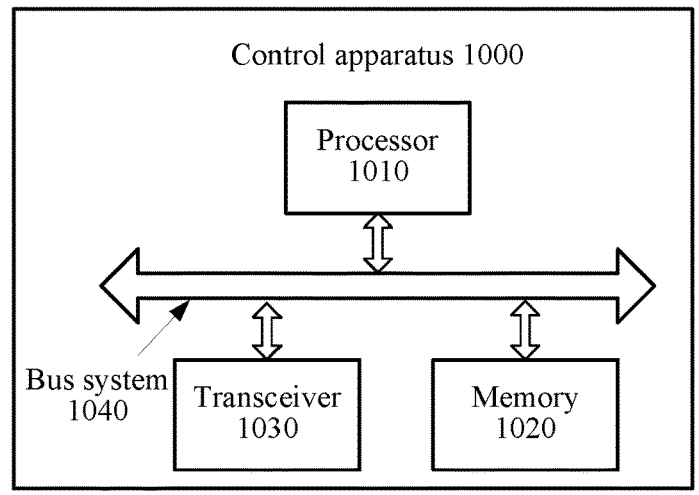
FIG. 10 is a schematic block diagram of a control apparatus for a vehicle according to another embodiment of the present invention.

As shown in FIG. 10, an embodiment of the present invention further provides a control apparatus 1000 for a vehicle. The control apparatus 1000 may be installed in the vehicle. The control apparatus 1000 includes a processor 1010, a memory 1020, a transceiver 1030, and a bus system 1040. The processor 1010, the memory 1020, and the transceiver 1030 are mutually connected by using the bus system 1040. The memory 1020 is configured to store an instruction. The processor 1010 is configured to execute the instruction stored in the memory 1020, to control the transceiver 1030 to receive and send a signal. The processor 1010 is configured to obtain obstacle information. The obstacle information includes at least one of a distance between the obstacle and the vehicle, a moving speed of the obstacle, or a location of the obstacle. The transceiver 1030 is configured to send the obstacle information to a network device, so that the network device sends second planning information to a second vehicle according to the obstacle information. The second planning information is used to instruct the second vehicle to avoid the obstacle or the vehicle after the vehicle avoids the obstacle.

Therefore, when detecting an obstacle and the obstacle is relatively close, the control apparatus for a vehicle in this embodiment of the present invention may control the vehicle to perform avoidance first, and then send planning information to the network device, so that the network device coordinates, according to the obstacle and an avoidance manner of the vehicle, another vehicle to cooperate in avoiding the obstacle. When the vehicle is relatively far from the obstacle, the control apparatus may control the vehicle to send obstacle information to the network device, and the network device plans a manner in which the vehicle and another vehicle avoid the obstacle. In this way, when each vehicle avoids the obstacle, a collision accident between the vehicles can be prevented, so that safer and more ordered traffic is achieved, and a traffic accident caused because another vehicle cannot coordinate and cooperate with a single vehicle during self-driving of the vehicle is prevented. Therefore, traffic safety can be greatly improved.

It should be understood that, in this embodiment of the present invention, the processor 1010 may be a CPU, or the processor 1010 may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor, or the like.

The memory 1020 may include a read-only memory and a random access memory, and provide an instruction and data to the processor 1010. A part of the memory 1020 may further include a non-volatile random access memory. For example, the memory 1020 may further store device-type information.

The bus system 1040 may further include a power bus, a control bus, a status signal bus, and the like in addition to a data bus. However, for clear description, various types of buses in the figure are marked as the bus system 1040.

In an implementation process, steps in the foregoing methods may be completed by using an integrated logical circuit of hardware in the processor 1010 or an instruction in a form of software. The operations in the methods disclosed with reference to the embodiments of the present invention may be directly performed and completed by a hardware processor, or may be performed and completed by using a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory 1020, and the processor 1010 reads information in the memory 1020 and completes the steps in the foregoing methods in combination with hardware of the processor 1010. To avoid repetition, details are not described herein again.

In one embodiment, the processor 1010 is configured to determine, according to the obstacle information, a time period in which the vehicle arrives at the obstacle. The transceiver 1030 is further configured to: when the time period in which the vehicle arrives at the obstacle is greater than or equal to a preset time period, send, by the vehicle, the obstacle information to the network device; and receive first planning information that is sent by the network device according to the obstacle information. The processor 1010 is further configured to avoid the obstacle according to the first planning information.

Optionally, the first planning information includes information for instructing the vehicle to perform emergency braking, decelerate, or perform lane change.

In one embodiment, the processor 1010 is further configured to: determine, according to the obstacle information, a time period in which the vehicle arrives at the obstacle; when the time period in which the vehicle arrives at the obstacle is less than a preset time period, determine third planning information according to the obstacle information; and avoid the obstacle according to the third planning information. The transceiver 1030 is further configured to send the obstacle information and the third planning information to the network device, so that the network device sends the second planning information to the second vehicle according to the obstacle information and the third planning information.

In one embodiment, the processor 1010 is further configured to: according to the third planning information, perform emergency braking to avoid the obstacle, decelerate to avoid the obstacle, or perform lane change to avoid the obstacle.

It should be understood that, the control apparatus 1000 for a vehicle according to this embodiment of the present invention may correspond to the control apparatus 600 for a vehicle in the embodiments of the present invention, and may correspond to a control apparatus in the first vehicle that executes the method 200 according to the embodiments of the present invention, and the foregoing and other operations and/or functions of the modules in the control apparatus 1000 are separately for implementing corresponding procedures of the first vehicle in the method in FIG. 2. For brevity, details are not described herein again.

Therefore, when detecting an obstacle and the obstacle is relatively close, the control apparatus for a vehicle in this embodiment of the present invention may control the vehicle to perform avoidance first, and then send planning information to the network device, so that the network device coordinates, according to the obstacle and an avoidance manner of the vehicle, another vehicle to cooperate in avoiding the obstacle. When the vehicle is relatively far from the obstacle, the control apparatus may control the vehicle to send obstacle information to the network device, and the network device plans a manner in which the vehicle and another vehicle avoid the obstacle. In this way, when each vehicle avoids the obstacle, a collision accident between the vehicles can be prevented, so that safer and more ordered traffic is achieved, and a traffic accident caused because another vehicle cannot coordinate and cooperate with a single vehicle during self-driving of the vehicle is prevented. Therefore, traffic safety can be greatly improved.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is only an example. For example, the unit division is only logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are only specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A self-driving method, comprising:

sending, by a first vehicle, lane change request information to a network device, to request to change from a first lane to a second lane;

sending, by the first vehicle, first real-time information to the network device, wherein the first real-time information comprises a vehicle speed and a location of the first vehicle;

receiving, by the first vehicle in response to the lane change request information, first lane change indication information from the network device, wherein the first lane change indication information is determined by the network device when the network device determines according to the first real-time information and second real-time information that the first vehicle is allowed to change from the first lane to the second lane, wherein the second real-time information is sent by a second vehicle to the network device, the second real-time information comprises a vehicle speed and a location of the second vehicle, and wherein the first lane change indication information indicates that the first vehicle is allowed to change from the first lane to the second lane; and changing, by the first vehicle, from the first lane to the second lane according to the first lane change indication information;

wherein when the network device determines, according to the first real-time information and the second real-time information, that the first vehicle is not allowed to change from the first lane to the second lane, the method further comprises:

receiving, by the first vehicle, first vehicle speed information from the network device, wherein the first vehicle speed information is determined by the network device according to the vehicle speeds and the location of the first vehicle and the vehicle speed and the location of the second vehicle;

using, by the first vehicle, a sensor to detect an ambient condition of the first vehicle, and
when an object having a negative effect on a driving safety of the first vehicle is not detected in the ambient condition, adjusting the vehicle speed of the first vehicle to a first vehicle speed according to the first vehicle speed information, or
when an object having the negative effect on the driving safety of the first vehicle is detected in the ambient condition, sending the detected ambient condition to the network device to request a modification of the first vehicle speed information, receiving modified first vehicle speed information sent by the network device, and adjusting the vehicle speed of the first vehicle to the first vehicle speed according to the modified first vehicle speed information;

sending, by the first vehicle, third real-time information to the network device, wherein the third real-time information comprises a vehicle speed and a location of the first vehicle that are obtained after the first vehicle adjusts the vehicle speed according to the first vehicle speed information or the modified first vehicle speed information; and receiving, by the first vehicle, second lane change indication information from the network device, in response to the lane change request information according to the third real-time information and fourth real-time information, wherein the fourth real-time information is sent by the second vehicle to the network device, the fourth real-time information comprises a vehicle speed and a location that are obtained after the second vehicle adjusts vehicle speed of the second vehicle according to second vehicle speed information, and the second vehicle speed information is determined by the network device according to the first real-time information and the second real-time information.

2. The method according to claim 1, further comprising:

sending, by the first vehicle, a vehicle message to the network device, wherein the vehicle message comprises current geographic location information, vehicle speed information, and destination information of the first vehicle;

receiving, by the first vehicle, a route planning message that is sent by the network device in response to the vehicle message, wherein the route planning message comprises lane change information and lane change preparation area information, wherein the lane change information is used to indicate that when driving from the current geographic location to the destination, the first vehicle needs to change from the first lane to the second lane, and wherein the lane change preparation area information is used to indicate a location of a lane change preparation area that is on the first lane and in which the first vehicle prepares to change from the first lane to the second lane;

determining, by the first vehicle, according to the route planning message, to enter the lane change preparation area; and sending, by the first vehicle, the lane change request information to the network device.

3. A self-driving scheduling method, comprising:

receiving, by a network device, lane change request information from a first vehicle, wherein the lane change request information is used by the first vehicle to request to change from a first lane to a second lane;

receiving, by the network device, first real-time information from the first vehicle, wherein the first real-time information comprises a vehicle speed and a location of the first vehicle;

receiving, by the network device, second real-time information from a second vehicle, wherein the second real-time information comprises a vehicle speed and a location of the second vehicle; and determining, by the network device, according to the first real-time information and second real-time information that the first vehicle is allowed to change from the first lane to the second lane;

in response to the determination that the first vehicle is allowed to change from the first lane to the second lane, determining, by the network device, first lane change indication information according to the lane change request information, the first real-time information, and the second real-time information, and sending the first lane change indication information to the first vehicle, to instruct the first vehicle to change from the first lane to the second lane;

wherein when the network device determines, according to the first real-time information and the second real-time information, that the first vehicle is not allowed to change from the first lane to the second lane, the method further comprises:

determining, by the network device, first vehicle speed information of the first vehicle and second vehicle speed information of the second vehicle according to the vehicle speed and the locations of the first vehicle and the vehicle speed and the location of the second vehicle, wherein the first vehicle speed information is used to instruct the first vehicle to adjust the vehicle speed of the first vehicle to a first vehicle speed, and the second vehicle speed information is used to instruct the second vehicle to adjust the vehicle speed of the second vehicle to a second vehicle speed;

sending, by the network device, the first vehicle speed information to the first vehicle, and sending the second vehicle speed information to the second vehicle;

receiving, by the network device, a request to modify the first vehicle speed information form the first vehicle, and modifying the first vehicle speed information according to an ambient condition of the first vehicle included in the request and sending modified first vehicle speed information to the first vehicle, wherein the request comprises the ambient condition of the first vehicle detected by the first vehicle using a sensor, and wherein the request is issued by the first vehicle when an object having a negative effect on a driving safety of the first vehicle is detected in the ambient condition;

receiving, by the network device, third real-time information from the first vehicle, wherein the third real-time information comprises a vehicle speed and a location that are obtained after the first vehicle adjusts the vehicle speed according to the first vehicle speed information or the modified first vehicle speed information;

receiving, by the network device, fourth real-time information sent by the second vehicle, wherein the fourth real-time information comprises a vehicle speed and a location that are obtained after the second vehicle adjusts the vehicle speed according to the second vehicle speed information; and determining, by the network device, second lane change indication information according to the lane change request information, the third real-time information, and the fourth real-time information.

4. The method according to claim 3, further comprising:

receiving, by the network device, a vehicle message from the first vehicle, wherein the vehicle message comprises current geographic location information, vehicle speed information, and destination information of the first vehicle;

determining, by the network device according to the current geographic location information of the first vehicle, a lane on which the first vehicle is currently located;

determining, by the network device according to the lane on which the first vehicle is currently located and the destination information, that the first vehicle needs to change from the first lane to the second lane, and a lane change preparation area in which the first vehicle prepares to change from the first lane to the second lane; and sending, by the network device, a route planning message to the first vehicle, wherein the route planning message comprises lane change information and lane change preparation area information, wherein the lane change information is used to indicate that when driving from the current geographic location to the destination, the first vehicle needs to change from the first lane to the second lane, and the lane change preparation area information is used to indicate a location of the lane change preparation area; and the receiving, by a network device, lane change request information from the first vehicle comprises:

receiving, by the network device, the lane change request information that is sent by the first vehicle when the first vehicle determines, according to the route planning message, to enter the lane change preparation area.

5. A control apparatus for a first vehicle, comprising a processor and a memory, wherein the memory stores an instruction, which when executed by the processor, cause the apparatus to perform operations comprising:

sending lane change request information to a network device, to request to change from a first lane to a second lane;

sending first real-time information to the network device, wherein the first real-time information comprises a vehicle speed and a location of the first vehicle;

receiving, in response to the lane change request information, first lane change indication information from the network device, wherein the first lane change indication information is determined by the network device when the network device determines according to the first real-time information and second real-time information that the first vehicle is allowed to change from the first lane to the second lane, wherein the second real-time information is sent by a second vehicle to the network device, the second real-time information comprises a vehicle speed and a location of the second vehicle, and wherein the first lane change indication information indicates that the first vehicle is allowed to change from the first lane to the second lane; and changing from the first lane to the second lane according to the first lane change indication information;

wherein when the network device determines, according to the first real-time information and the second real-time information, that the first vehicle is not allowed to change from the first lane to the second lane, the apparatus further performs the operations comprising:

receiving first vehicle speed information from the network device, wherein the first vehicle speed information is determined by the network device according to the vehicle speed and the locations of the first vehicle and the vehicle speed and the location of the second vehicle;

using a sensor to detect an ambient condition of the first vehicle, and when an object having a negative effect on a driving safety of the first vehicle is not detected in the ambient condition, adjusting the vehicle speed of the first vehicle to a first vehicle speed according to the first vehicle speed information, or when an object having the negative effect on the driving safety of the first vehicle is detected in the ambient condition, sending the detected ambient condition to the network device to request a modification of the first vehicle speed information, receiving modified first vehicle speed information sent by the network device, and adjusting the vehicle speed of the first vehicle to the first vehicle speed according to the modified first vehicle speed information;

sending third real-time information to the network device, wherein the third real-time information comprises a vehicle speed and a location of the first vehicle that are obtained after the first vehicle adjusts the vehicle speed according to the first vehicle speed information or the modified first vehicle speed information; and receiving second lane change indication information from the network device, in response to the lane change request information according to the third real-time information and fourth real-time information, wherein the fourth real-time information is sent by the second vehicle to the network device, the fourth real-time information comprises a vehicle speed and a location that are obtained after the second vehicle adjusts vehicle speed of the second vehicle according to second vehicle speed information, and the second vehicle speed information is determined by the network device according to the first real-time information and the second real-time information.

6. The control apparatus according to claim 5, the apparatus further performs the operations comprising:
sending a vehicle message to the network device, wherein the vehicle message comprises current geographic location information, vehicle speed information, and destination information of the first vehicle;
receiving a route planning message that is sent by the network device in response to the vehicle message, wherein the route planning message comprises lane change information and lane change preparation area information, wherein the lane change information is used to indicate that when driving from the current geographic location to the destination, the first vehicle needs to change from the first lane to the second lane, and wherein the lane change preparation area information is used to indicate a location of a lane change preparation area that is on the first lane and in which the first vehicle prepares to change from the first lane to the second lane;
determining according to the route planning message, to enter the lane change preparation area; and
sending the lane change request information to the network device.

7. A network device, comprising a processor and a memory, wherein the memory stores an instruction, which when executed by the processor, cause the apparatus to perform operations comprising:
receiving lane change request information from a first vehicle, wherein the lane change request information is used by the first vehicle to request to change from a first lane to a second lane;
receiving first real-time information from the first vehicle, wherein the first real-time information comprises a vehicle speed and a location of the first vehicle;
receiving second real-time information from a second vehicle, wherein the second real-time information comprises a vehicle speed and a location of the second vehicle; and
determining according to the first real-time information and second real-time information that the first vehicle is allowed to change from the first lane to the second lane;
in response to the determination that the first vehicle is allowed to change from the first lane to the second lane, determining first lane change indication information according to the lane change request information, the first real-time information, and the second real-time information, and sending the first lane change indication information to the first vehicle, to instruct the first vehicle to change from the first lane to the second lane;
wherein when the network device determines, according to the first real-time information and the second real-time information, that the first vehicle is not allowed to change from the first lane to the second lane, the apparatus further performs the operations comprising:
determining first vehicle speed information of the first vehicle and second vehicle speed information of the second vehicle according to the vehicle speed and the location of the first vehicle and the vehicle speed and the location of the second vehicle, wherein the first vehicle speed information is used to instruct the first vehicle to adjust a current vehicle speed of the first vehicle to a first vehicle speed, and the second vehicle speed information is used to instruct the second vehicle to adjust a current vehicle speed of the second vehicle to a second vehicle speed;
sending the first vehicle speed information to the first vehicle, and sending the second vehicle speed information to the second vehicle;
receiving a request to modify the first vehicle speed information form the first vehicle, and modifying the first vehicle speed information according to an ambient condition of the first vehicle included in the request and sending modified first vehicle speed information to the first vehicle, wherein the request comprises the ambient condition of the first vehicle detected by the first vehicle using a sensor, and wherein the request is issued by the first vehicle when an object having a negative effect on a driving safety of the first vehicle is detected in the ambient condition;
receiving third real-time information from the first vehicle, wherein the third real-time information comprises a vehicle speed and a location that are obtained after the first vehicle adjusts the vehicle speed according to the first vehicle speed information or the modified first vehicle speed information;
receiving fourth real-time information sent by the second vehicle, wherein the fourth real-time information comprises a vehicle speed and a location that are obtained after the second vehicle adjusts the vehicle speed according to the second vehicle speed information; and
determining second lane change indication information according to the lane change request information, the third real-time information, and the fourth real-time information.

8. The network device according to claim 7, the apparatus further performs the operations comprising:
receiving a vehicle message from the first vehicle, wherein the vehicle message comprises current geographic location information, vehicle speed information, and destination information of the first vehicle;
determining according to the current geographic location information of the first vehicle, a lane on which the first vehicle is currently located;
determining according to the lane on which the first vehicle is currently located and the destination information, that the first vehicle needs to change from the first lane to the second lane, and a lane change preparation area in which the first vehicle prepares to change from the first lane to the second lane; and
sending a route planning message to the first vehicle, wherein the route planning message comprises lane change information and lane change preparation area information, wherein the lane change information is used to indicate that when driving from the current geographic location to the destination, the first vehicle needs to change from the first lane to the second lane, and the lane change preparation area information is used to indicate a location of the lane change preparation area; and
the receiving lane change request information from the first vehicle comprises:
receiving the lane change request information that is sent by the first vehicle when the first vehicle determines, according to the route planning message, to enter the lane change preparation area.

\* \* \* \* \*